(12) United States Patent
Morey et al.

(10) Patent No.: US 8,122,982 B2
(45) Date of Patent: Feb. 28, 2012

(54) MOBILE ROBOT SYSTEMS AND METHODS

(75) Inventors: Christopher Lynn Morey, San Luis Obispo, CA (US); Pavlo Rudakevych, Arroyo Grande, CA (US); Garran M. Gossage, San Luis Obispo, CA (US)

(73) Assignee: Irobot Corporation, Bedford, MA (US)

( * ) Notice: Subject to any disclaimer, the term of this patent is extended or adjusted under 35 U.S.C. 154(b) by 0 days.

(21) Appl. No.: 13/052,022

(22) Filed: Mar. 18, 2011

(65) Prior Publication Data

US 2011/0266076 A1 Nov. 3, 2011

Related U.S. Application Data

(63) Continuation of application No. 12/331,380, filed on Dec. 9, 2008, now Pat. No. 7,926,598.

(51) Int. Cl.
*B62D 55/00* (2006.01)
(52) U.S. Cl. ........................................ 180/9.32; 180/8.2
(58) Field of Classification Search ................ 180/9.32, 180/9.1, 8.2, 8.7, 8.5, 14.1
See application file for complete search history.

(56) References Cited

U.S. PATENT DOCUMENTS 3,166,138 A 1/1965 Dunn
(Continued)

FOREIGN PATENT DOCUMENTS

WO 2005105388 11/2005

OTHER PUBLICATIONS

Barnes, M., Everett, H.R., and P. Rudakevych; "ThrowBot: Design Considerations for a Man-Portable Throwable Robot," SPIE Proc. 5804; Unmanned Ground Vehicle Technology VII, Orlando, FL, Mar. 29-31, 2005 (10 pages).

(Continued)

*Primary Examiner* — Tashiana Adams
(74) *Attorney, Agent, or Firm* — O'Brien Jones PLLC

(57) ABSTRACT

Mobile robot systems and methods are provided. At least one tracked mobile robot has a first end comprising a first pair of wheels, a second end comprising a second pair of wheels, an articulated arm coaxial with the first pair of wheels, and a driven support surface surrounding the first pair of wheels and the second pair of wheels. The at least one mobile robot surmounts obstacles and performs additional maneuvers alone and in combination with at least one other mobile robot.

8 Claims, 18 Drawing Sheets

U.S. PATENT DOCUMENTS

| | | | |
|---|---|---|---|
| 4,727,949 A * | 3/1988 | Rea et al. | 180/9.32 |
| 6,263,989 B1 | 7/2001 | Won | |
| 6,431,296 B1 | 8/2002 | Won | |
| 6,523,629 B1 * | 2/2003 | Buttz et al. | 180/167 |
| 6,615,885 B1 | 9/2003 | Ohm | |
| 6,668,951 B2 | 12/2003 | Won | |
| 6,809,490 B2 | 10/2004 | Jones et al. | |
| 6,837,318 B1 * | 1/2005 | Craig et al. | 180/6.7 |
| 6,883,201 B2 | 4/2005 | Jones et al. | |
| 7,011,171 B1 | 3/2006 | Poulter | |
| 7,459,871 B2 | 12/2008 | Landry et al. | |
| 7,468,592 B2 * | 12/2008 | Lim et al. | 318/568.12 |
| 7,546,891 B2 | 6/2009 | Won | |
| 7,581,605 B2 | 9/2009 | Caspi et al. | |
| 7,654,348 B2 | 2/2010 | Ohm et al. | |
| 7,793,743 B2 * | 9/2010 | Kamimura | 180/9.32 |
| 8,002,365 B2 * | 8/2011 | Jacobsen et al. | 305/129 |
| 2002/0062999 A1 | 5/2002 | De-Noor et al. | |
| 2003/0183428 A1 | 10/2003 | Hedeen | |
| 2007/0029117 A1 | 2/2007 | Goldenberg et al. | |
| 2008/0086241 A1 | 4/2008 | Phillips et al. | |
| 2008/0179115 A1 | 7/2008 | Ohm et al. | |
| 2008/0196946 A1 | 8/2008 | Filippov et al. | |
| 2008/0223630 A1 | 9/2008 | Couture et al. | |
| 2009/0065271 A1 | 3/2009 | Won | |
| 2009/0314554 A1 | 12/2009 | Couture et al. | |

OTHER PUBLICATIONS

LANdroids; BAA-0746 Proposer Information Pamphlet for Defense Advanced Research Projects Agency; Information Processing Technology Office, 2007 (34 pages).

SuperDroid Robots, Inc.; SuperDroid Robots; Robots, Parts and Custom Solutions; LT-F Data Sheet; www.SuperDroidRobots.com; Revised Jul. 20, 2009 (7 pages).

International Search Report and Written Opinion in Connection with International Application No. PCT/US2008/086106, dated Oct. 15, 2009. (18 pages).

SuperDroid Robots, LT-F Compact Treaded All Terrain Surveillance & Inspection Robot, Dec. 17, 2008 (pp. 1-5).

SuperDroid Robots, Treaded All Terrain LT Robot Support Page, Jul. 2008.

SuperDroid Robots, LT-F Tracked Robot with Flipper-Stabilizer Arm Kit, Jul. 2008.

* cited by examiner

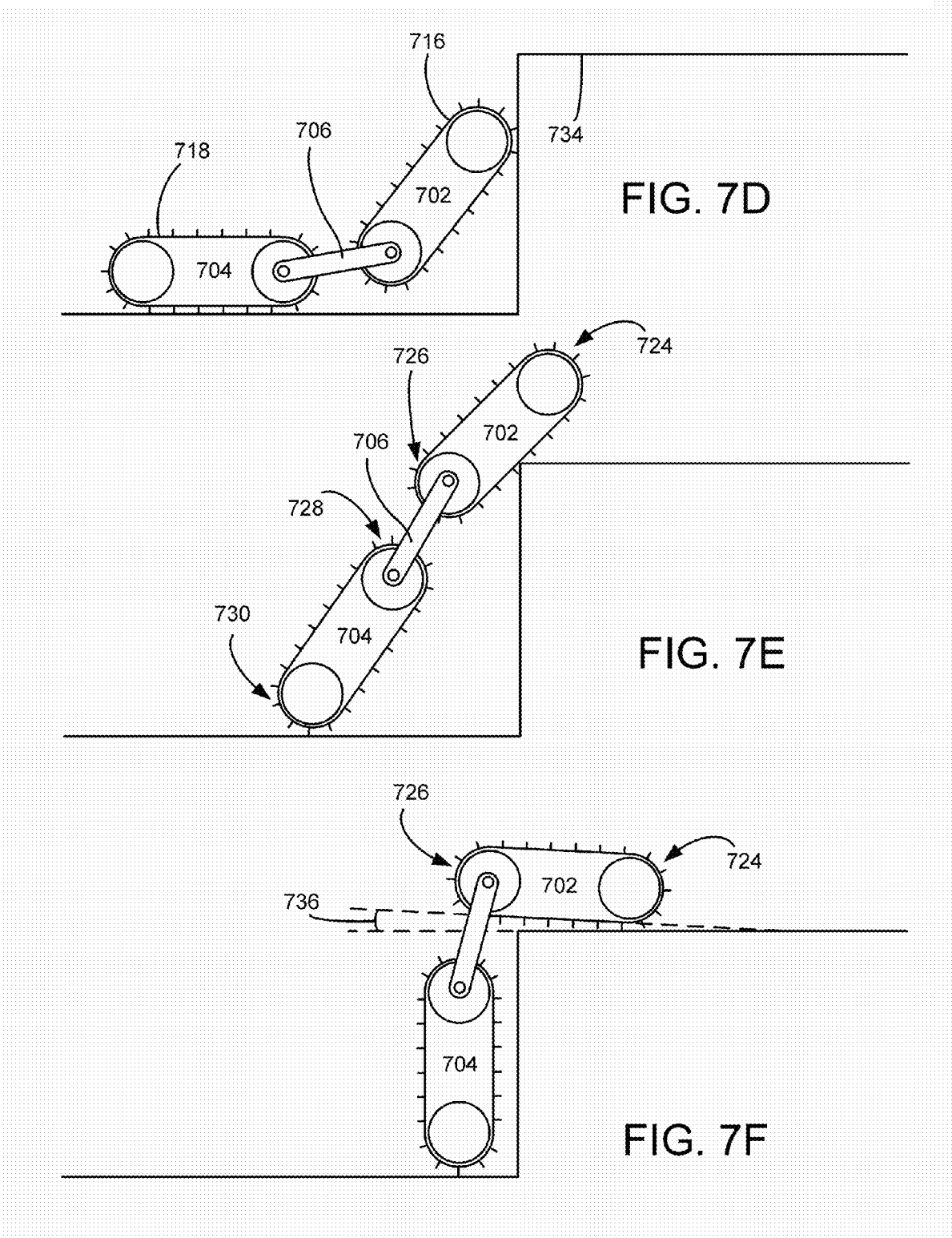

FIG. 9C
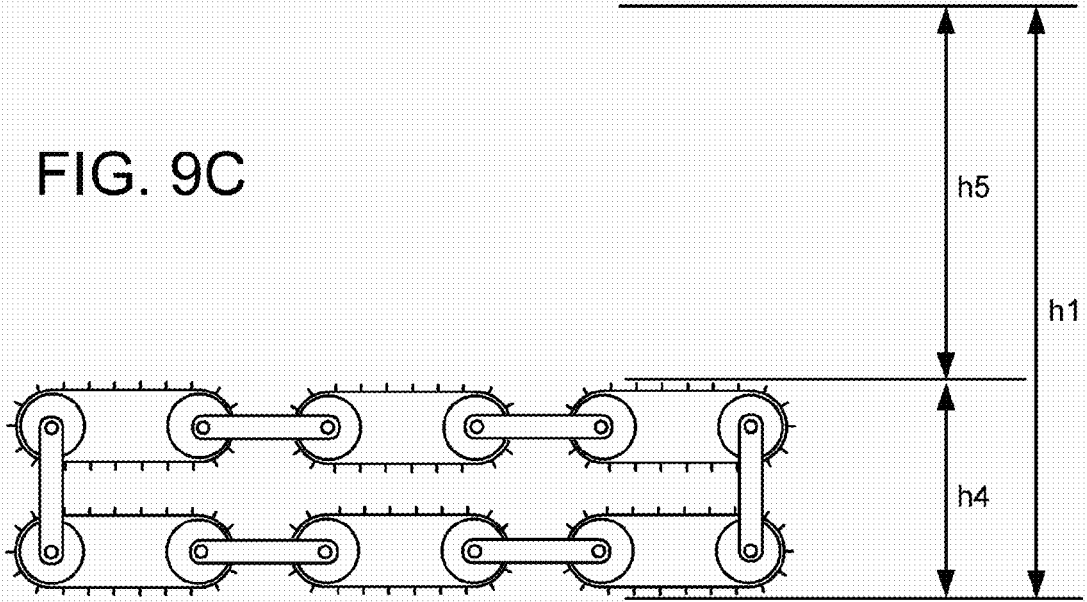
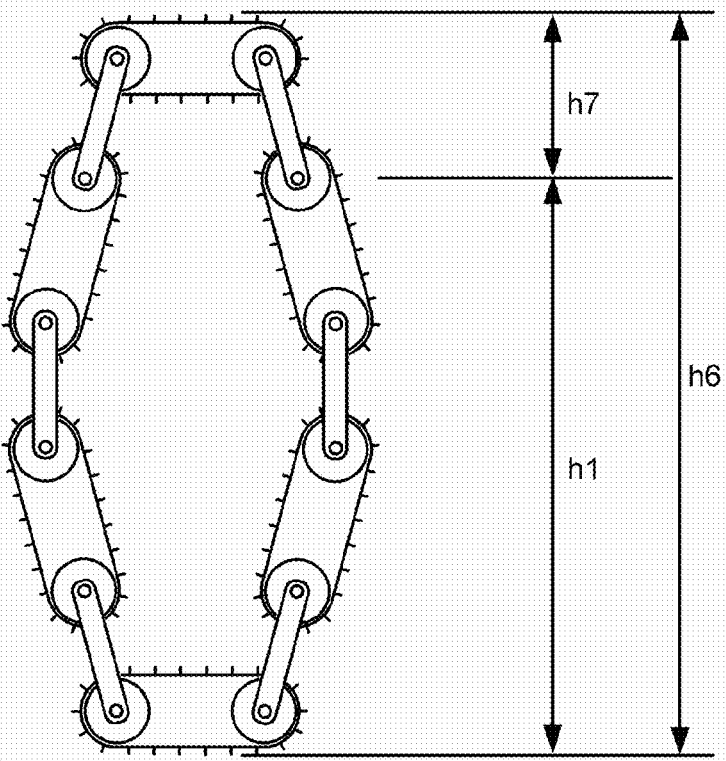
FIG. 9D

MOBILE ROBOT SYSTEMS AND METHODS

CROSS REFERENCE TO RELATED APPLICATIONS

The present application is to a continuation of U.S. patent application Ser. No. 12/331,380, filed Dec. 9, 2008 now U.S. Pat. No. 7,926,598, which is incorporated by reference herein in its entirety.

BACKGROUND

Robotic mobile platforms are useful in a variety of civilian, military, and law enforcement applications. For instance, a robotically controlled mobility platform can be used to inspect or search buildings under hazardous or hostile conditions. Dangerous situations can be made less hazardous by providing detailed information about the location, activities, and capabilities of opponents. Military applications for robotic mobile platforms can include reconnaissance, surveillance, bomb disposal and security patrols.

SUMMARY

Systems and methods are provided according to the present teachings for a tracked mobile robot having a first end comprising a first pair of wheels, a second end comprising a second pair of wheels, a center of gravity between the first end and the second end, at least one articulated arm coaxial with the first pair of wheels such that the first pair of wheels and the articulated arm can rotate freely relative to each other, and a driven support surface surrounding the first pair of wheels and the second pair of wheels, and a stair climbing method comprising driving the support surface to propel the robot along a ground surface until the first end contacts a riser of an obstacle, rotating the at least one articulated arm in a first direction to contact the ground surface to lift the second end over the center of gravity to contact an upper portion of the riser, driving the support surface to propel the second end of the robot up and over the obstacle riser until the center of gravity of the robot surmounts the obstacle, and rotating the at least one articulated arm in a second direction to trail the robot.

Systems and methods are also provided according to the present teachings for balancing a tracked mobile robot having a first end comprising a first pair of wheels surrounded by a track, an articulated arm coaxial with the first pair of wheels such that the first pair of wheels and the articulated arm can rotate freely relative to each other, a second end comprising a second pair of wheels surrounded by the track, a center of gravity between the first end and the second end, and a sensor to determine the relative orientation of the first end and the second end, and a balancing method comprising rotating the articulated arm in a first direction to contact the ground to raise the second end substantially above the center of gravity, balancing the robot with only a portion of the track surrounding the first pair of wheels in contact with the ground while maintaining the second end substantially above the center of gravity according to data from the sensor, rotating the articulated arm in a second direction to disengage the arm from the ground, and driving the track to move the robot using only the portion of the track surrounding the first pair of wheels in contact with the ground while maintaining the second end substantially above the center of gravity according to data received from the sensor.

Systems and methods are also provided according to the present teachings for a mobile robot system, comprising a first robotic vehicle comprising a first end comprising a first pair of wheels, a second end comprising a second pair of wheels, and a first driven support surface surrounding the first and second pair of wheels to propel the first vehicle in the direction of the first and second ends of the first vehicle, a second robotic vehicle comprising a first end oriented toward the second end of the first vehicle and comprising a third pair of wheels, a second end oriented away from the first vehicle and comprising a fourth pair of wheels, and a second driven support surface surrounding the third and fourth pair of wheels to propel the second vehicle in the direction of the first and second ends of the second vehicle, and a connecting member rotatably connected to the second end of the first vehicle to be coaxial with the second pair of wheels and rotatably connected to the first end of the second vehicle to be coaxial with the third pair of wheels, the connecting member being rotatable about the axis of the second pair of wheels by the first vehicle and rotatable about the axis of the third pair of wheels by the second vehicle such that the connecting member and each pair of wheels can rotate freely relative to each other.

Systems and methods are also provided according to the present teachings for a mobile robot system comprising a first vehicle having a first end comprising a first pair of wheels, a second end comprising a second pair of wheels, and a first driven support surface surrounding the first and second pairs of wheels, a second vehicle having a first end oriented toward the second end of the first vehicle and comprising a third pair of wheels, a second end oriented away from the first vehicle and comprising a fourth pair of wheels, and a second driven support surface surrounding the third and fourth pairs of wheels, and a connecting member rotatably connected to the first vehicle coaxial with the second pair of wheels and to the second vehicle coaxial with the third pair of wheels such that the connecting member and each pair of wheels can rotate freely relative to each other, and a method for operating a mobile robot system to surmount an obstacle comprising driving at least one of the first and second support surfaces to move the first vehicle and the second vehicle toward the obstacle until the first vehicle contacts the obstacle, driving at least one of the first and second support surfaces to propel the first vehicle to ascend the obstacle, rotating the connecting member in at least one of a first direction by the first vehicle and a second direction by the second vehicle while the first vehicle ascends the obstacle, driving at least one of the first and second support surfaces and rotating the connecting member by at least one of the second vehicle in a third direction opposite to the second direction and by the first vehicle in a fourth direction opposite to the first direction while the first vehicle surmounts the obstacle to raise the first end of the second vehicle by the connecting member, driving at least one of the first and second support surfaces when the first vehicle surmounts the obstacle until the connecting member contacts the obstacle at a point of contact, driving the second support surface while maintaining the orientation of the connecting member relative to the first and second vehicles to rotate the connecting member about the point of contact until the second support surface contacts the obstacle, rotating the connecting member by at least one of the first vehicle in the first direction and the second vehicle in the third direction until the first support surface engages the obstacle, driving at least one of the first and second support surfaces and rotating the connecting member by the first vehicle in the first direction until the second vehicle begins to surmount the obstacle, and driving at least one of the first and second support surfaces and rotating the connecting member by at least one of the first vehicle in a fourth direction opposite to the first direction and by the second vehicle in the second direction when the second vehicle surmounts the obstacle.

Systems and methods are also provided according to the present teachings for a mobile robot system, comprising a plurality of robotic vehicles comprising a first end having a first pair of wheels, a second end having a second pair of wheels, and a driven support surface movably connected to each robotic vehicle and surrounding the first and second pairs of wheels of a robotic vehicle to propel the robotic vehicle in the direction of the first and second ends, and a plurality of connecting members rotatably connected to the first end of each robotic vehicle coaxial with the first pair of wheels and to the second end of another of the robotic vehicles coaxial with the second pair of wheels of the another of the robotic vehicles to connect the first end of each of the plurality of vehicles to the second end of an adjacent one of the plurality of vehicles, and which is rotatable about the axis of the first pair of wheels and the axis of the second pair of wheels by the robotic vehicle to which it is connected such that the connecting member and each pair of wheels can rotate freely relative to each other.

Systems and methods are also provided according to the present teachings for a remote vehicle facilitating research and development applications, the remote vehicle comprising a chassis comprising a forward end, a rearward end, and a driven support surface movably connected to the chassis and configured to propel the chassis forward and rearward, a first articulated arm rotatable about an axis to in a first direction to raise the forward end and in a second direction opposite the first direction, a research and development platform comprising at least one payload bay disposed on the chassis and configured to support at least one development package, the at least one payload bay comprising at least one power/data connection to provide a data connection and a power supply to the at least one development package, and a plurality of heat dissipation elements disposed on the research and development platform in contact with the at least one payload bay to dissipate heat from the at least one development package and comprising aluminum heat dissipation fins, wherein the remote vehicle weighs less than two pounds.

DESCRIPTION OF THE DRAWINGS

FIGS. 7B-7N schematically illustrates exemplary obstacle surmounting maneuvers of a mobile robot system.

FIGS. 9A-9D illustrate an exemplary embodiment of a robot system in accordance with the present teachings.

DETAILED DESCRIPTION

The foregoing general description, the following detailed description, and the accompanying drawings, are exemplary and explanatory only and are not restrictive of the present teachings, as claimed. The following detailed description and accompanying drawings illustrate the best mode of the present teachings. For the purpose of teaching inventive principles, some aspects of the best mode may be simplified or omitted where they would be known to those of ordinary skill in the art.

Various tracked robotic vehicles have been developed that are the subject of, for example, U.S. Pat. Nos. 6,431,296, 6,263,989, 6,668,951 and 6,615,885. These patents are instructive on the construction of tracked robotic vehicles having driven flippers, and means of articulation of robotic components, and are hereby incorporated by reference herein in their entirety.

Autonomous control routines (or behaviors) and control systems are useful, for example, to assist an operator in controlling a robot by performing such tasks as avoiding an obstacle, escaping an area, navigating an area, optimizing communications coverage, or seeking improved radio performance, as disclosed in U.S. patent application Ser. No. 11/633,869 filed Dec. 4, 2006 and titled "AUTONOMOUS COVERAGE NAVIGATION SYSTEM", and U.S. patent application Ser. No. 12/100,782, filed Apr. 10, 2008 and titled "ROBOTICS SYSTEMS," the entire contents of which are incorporated herein in their entireties by reference.

Figure 1:
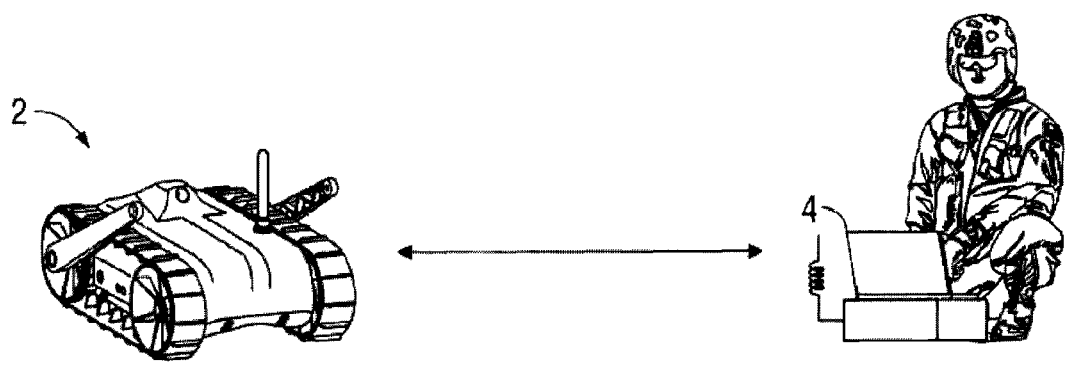
FIG. 1 illustrates a robot and remote control system therefor.
Figure 2A:
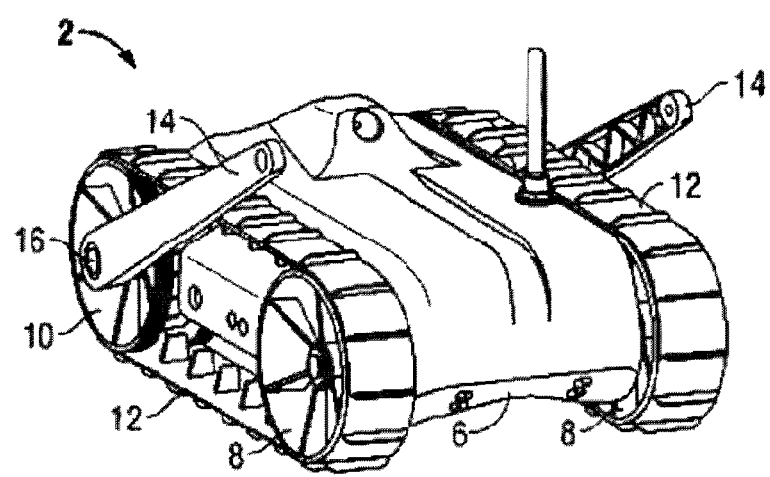
FIGS. 2A-2D are front perspective, front, side and top views of a small unmanned ground vehicle having flippers.
Figure 2B:
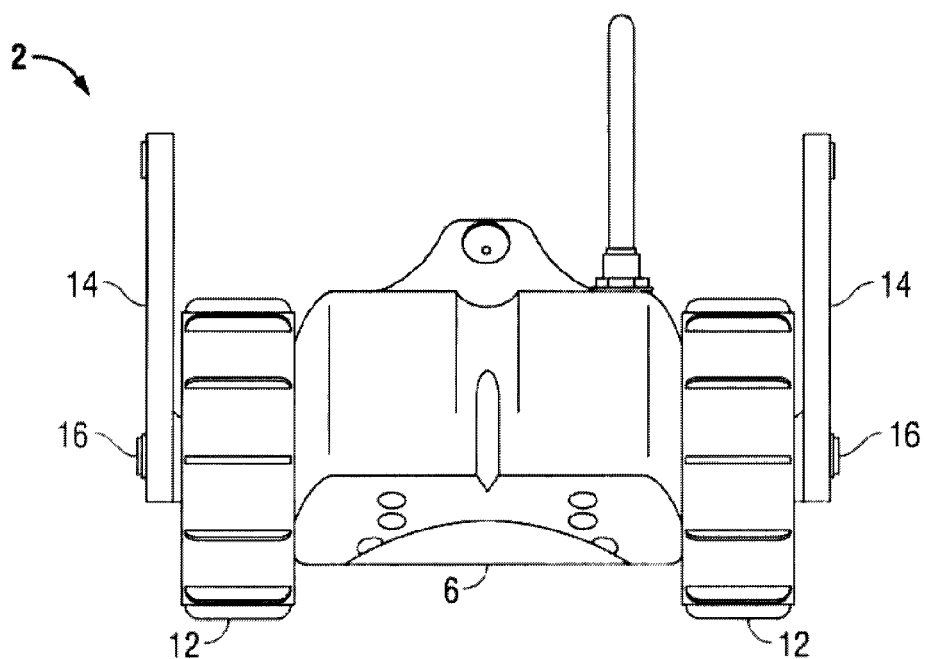
Figure 2C:
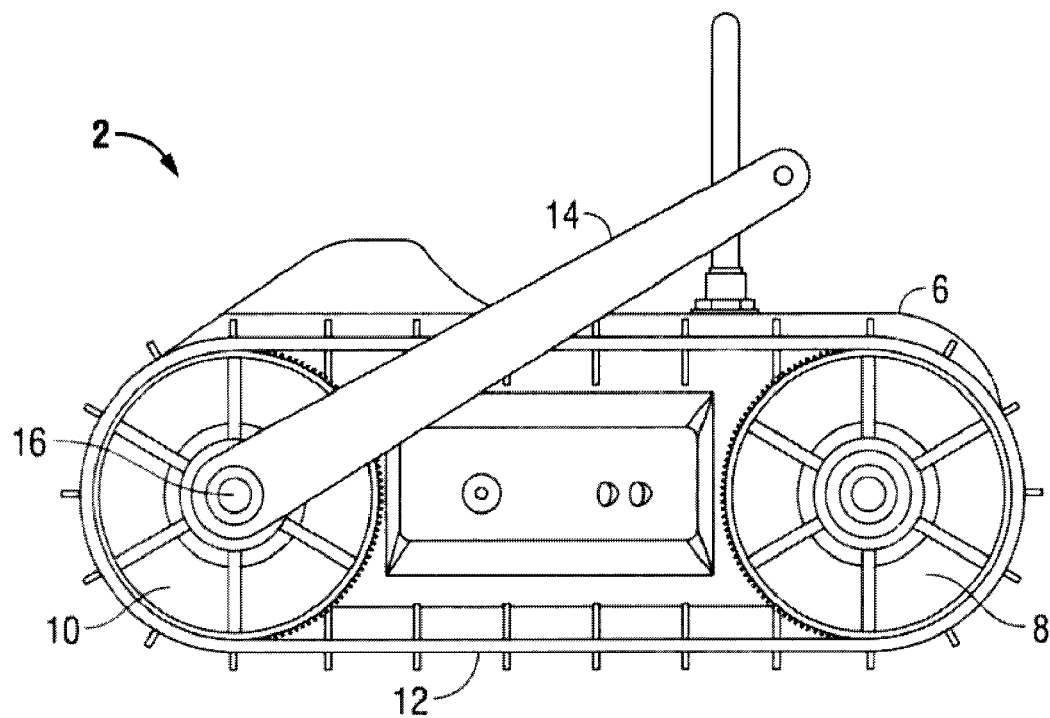
Figure 2D:
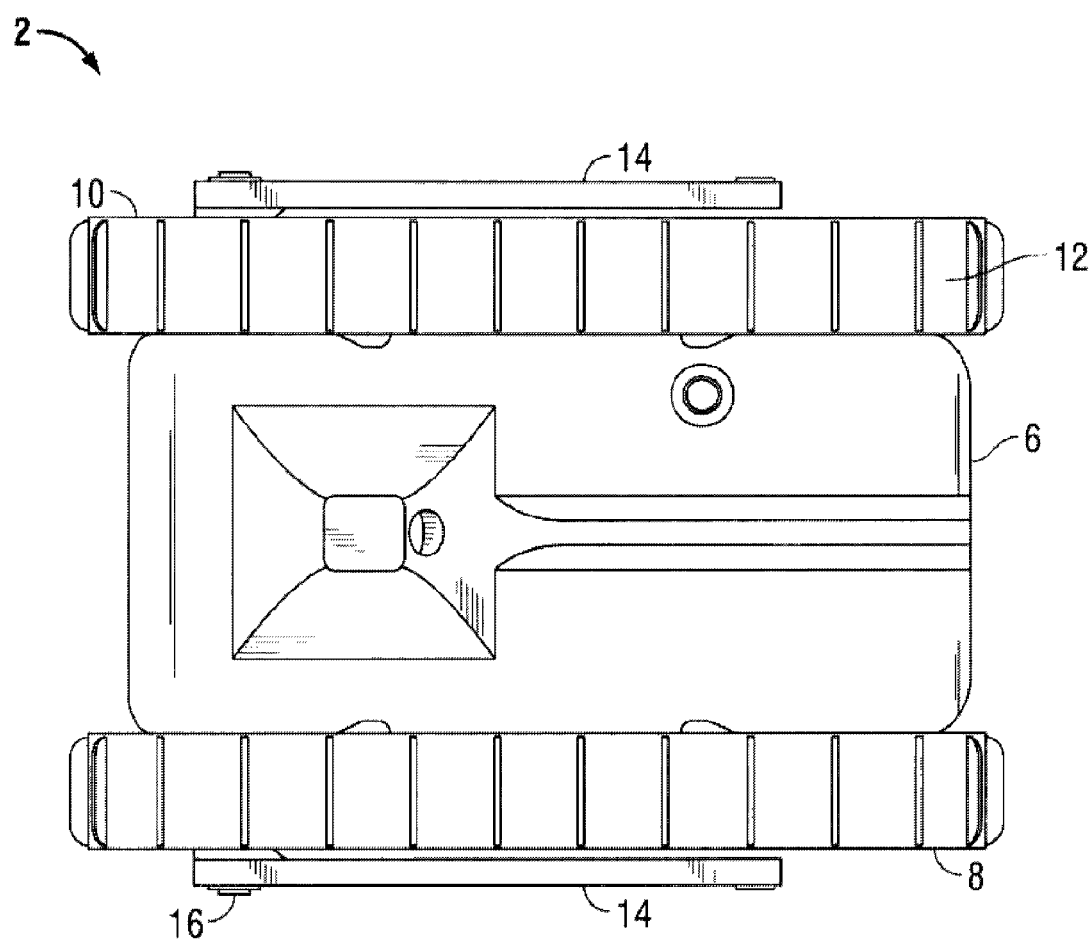

With reference to FIG. 1, a mobile robotic vehicle or robot 2 is operable via an Operator Control Unit (OCU) or remote control system 4. Remote communications can be transmitted via radio signal, infra red signal, Wi-Fi signal, cellular signal, or other suitable signal. In some circumstances, robot 2 can perform automated routines without remote use intervention. A combination of automated routines and operator controls can also be used to maneuver robot 2. Remote control system 4 can include any number of radio transceivers or other communications links and can interface with any number of robots or though any number of robots as mesh network nodes or other parts of a communications network.

One version of robot 2 is sized to be portable, and to substantially fit within a bounding volume of approximately 18 cm (7 in.) long, 12 cm (5 inches) wide and 6 cm (2 inches) tall. The overall dimensions of an exemplary embodiment can be, for example, about 16 cm×12 cm×6 cm, excluding the antenna and camera that may protrude from the chassis, with a total mass of about, for example, 0.5 kg and a top speed of about, for example, 0.6 m/s over a smooth surface. In certain embodiments of the present teachings, the vehicle is configured to fit within a combat uniform cargo pants pocket. In certain embodiments, multiple robots 2 can be stacked to fit in a backpack.

Compactness and portability allow robot 2 to be easily transported by an individual and to be deployed into an area by simply carrying the robot in a pack or a pocket and setting or tossing the robot in a desired location. The robot can be removed from its carrying compartment, activated for example by pulling a grenade-style pull pin, and set on the ground or tossed down a corridor, up a stairwell or into a window. In certain embodiments of the present teachings, the platform can be thrown by a single person or launched into an upper window or onto a rooftop using an improvised slingshot. Landing on a rooftop or upper level of a structure can allow the remotely operated platform to bypass some typical obstacles and travel down stairs to navigate the structure. The operator can evaluate the resultant video obtained while navigating the structure before determining the next course of action. The robot can also be used to search for and assess booby traps, enemy personnel, and improvised explosive devices (IEDs).

In various embodiments of the present teachings, each of the robot 2 and remote controller 4 weighs less than about eight pounds (about 3.6 kg). In some embodiments, the robot weighs between about 1 pound (about 0.5 kg) and about 2.2 pounds (about 1.0 kg) and the remote control 4 is a small PDA with a mass of less than about 1 pound (about 0.5 kg). A single charging station type can be used for both the remote control 4 and robot 2, or the devices can different types of charging stations. Remote control system 4 allows an operator to control robot 2 from a distance. In addition, in certain embodiments of the present teachings, the operator can select different levels of human control over the robot, ranging from a teleoperation mode, in which the operator directly controls the motors and actuators on the robot, to autonomous operation, in which the operator passes only higher-level command to the robot and the robot employs one or more pre-programmed behaviors to execute the commanded tasks. During partially autonomous operation, robot 2 can be teleoperated by the operator to perform a mission while autonomously performing one or more tasks such as following a wall, avoiding an obstacle, surmounting an obstacle, avoiding a drop off or "cliff," avoiding becoming high centered, evading a moving object, positioning a transceiver, self-righting, repositioning to optimize communication network coverage, and the like.

The remote control system 4 support teleoperation, tasking the robot with autonomous behaviors, and switching between teleoperation and autonomous control. The operator can interrupt autonomous operation of the robot at any time to give commands and direction, and the robot can perform certain ongoing semi-autonomous behaviors (e.g., object detection/avoidance and retrotraverse upon loss of communications) during teleoperation by the operator. In certain embodiments of the present teachings, the system can provide predetermined warning signals to the operator, for instance if it is unable to operate autonomously, possibly by means of visual or auditory indicators or a vibrating unit that could be worn by the operator and which would be effective in a noisy environment. In various embodiments, the operator can add additional tasks to the robot's mission and request notification from the robot when milestone tasks have been achieved.

Versions of the robot can perform various autonomous tasks which can be initiated by the operator from remote control system 4. These include obstacle avoidance, wall following, climbing stairs, recovery from high centering, self-righting, returning "home," searching for a designated object, mapping, and establishing a communications network. The robot can use the various mobility modes described above in these autonomous operations, and if necessary, can call for operator assistance during its execution of a task. Alternative configurations of pivotal arms can be used. For example, a single central "arm" can be used.

With reference to FIGS. 2A-2D, robot 2 includes a body portion or chassis or housing 6, drive components, a power supply, a control system and a communication module. The drive components include a pair of drive wheels 8 positioned at a forward end of chassis 6 and a pair of idler wheels 10 positioned at a rearward end of chassis 6. Wheels 8 and 10 can include, for example straight (shown) or spiral spokes, with spiral spokes providing additional impact resistance. Resilient spiral spoked wheel are discussed in detail, for example, in U.S. Pat. No. 6,615,885, filed Oct. 29, 2001, entitled "Resilient Wheel Structure"), the entire contents of which are incorporated by reference herein. A pair of resilient tracks 12 is trained about wheels 8 and 10 on opposing sides of chassis 6 extending along the sides of the chassis 6 to provide a driven support surface for robot 2. Tracks 12 preferably comprise continuous flexible belts with interior surface features for engaging drive wheels 8 and exterior surface features for gaining traction over various terrains.

First and second rotatable arms or flippers 14 extend radially a drive axle 16 that they share with idler wheels 10. In the illustrated embodiment, idler wheels 10 free spin about flipper drive axle 16. Flippers 14 are configured to rotate and be driven through a 360 degree range of motion to allow robot 2 to perform various positioning, obstacle surmounting and self-righting maneuvers. One skilled in the art will appreciate that a single rotatable arm can accomplish many or all of these functions and is contemplated by the present teachings.

In a particular embodiment, flippers 14 are made from a flame rated advanced formula polymer with 85D Shore hardness available from Quantum Cast, part number AFP3100FR, UL 94 FR and FAR 25.853. Through holes or other features can be provided on flippers 14 for attachment of flipper accessories, e.g., cameras, sensors, or wheels positioned at the flipper tip or along the flipper length. For example, a camera, antenna or sensor can be mounted on the end of the arm to provide better exposure or higher vantage point.

Flippers 14 can be driven by a motor (not shown) in a known manner to rotate to any desired angle relative to chassis 6. Robot 2 is designed to move about in a variety of environments, including an urban environment of buildings (including staircases), streets, underground tunnels, as well as in vegetation, such as through grass and around trees. Robot 2 has a variety of features which provide robust operation in these environments, including cleated tracks, flippers, impact resistance and tolerance of debris entrainment. Front wheels 8 and rear wheels 10 are positioned on chassis 6 to provide greater ground clearance when right side up, yet can provide sufficient clearance in some embodiments for operation when robot 2 is inverted. In accordance with the present teachings, robot 2 preferably can recover from a tumble or fall in which it is inverted by employing an autonomous or operator-commanded self-righting behavior that rotates the flippers appropriately until the robot 2 is righted.

In accordance with various embodiments of the present teachings, chassis 6 and other rigid robot components are designed for strength and low weight and can be made from durable plastic, polymer, composites, 7075-T6 aluminum or other suitable lightweight, impact resistant materials. Tracks 12, front wheels 8, rear wheels 10, and flippers 14 are also configured to be impact resistant. For example, front wheels 8 and rear wheels 10 can comprise a pliable material and can include spiraled spokes (not shown) to provide a degree of resilience. Impact resistance is accomplished, in part, by surrounding much of the vehicle with compliant tracks 12 having pliable cleats. Tracks 12 and their cleats provide a first layer of impact protection.

Tracks 12 are configured to provide skid steering and can include, for example, compliant belts made of polyurethane or a similar flexible material. The belts are abrasion-resistant and can have high strength and minimal stretch due to internal steel or fiber cording. In certain embodiments, tracks 12 can define a left-right alternating tread to smooth successive impacts on most surfaces with a 25 spacing between successive edges on the sides to catch larger terrain features for traction.

Tracks 12 can be stretched over front wheels 8 and rear wheels 10 and driven primarily by friction. The surfaces of front wheels 8 and rear wheels 10 contacting tracks 12 can be provided with a known fine knurl pattern to enhance friction with tracks 12 and prevent slippage from formation of water films between wheels 8, 10 and tracks 12. Alternatively, tracks 12 and drive wheels 8 can be formed with complementary features to provide positive drive engagement. For example, in certain embodiments of the present teachings, front wheels 8 and even rear wheels 10 can have V-shaped grooves around their circumference to receive an integral V-shaped rib on an inside of track 12.

Alternative embodiments of the robot 2 can use other types of tracks, such as tracks made up of discrete elements. However, debris may be caught between elements and such tracks are generally heavier than flexible belts. Other flexible materials can also be used for continuous belt tracks. Tracks 12 can include cleats, ridges, or other projections for additional traction. Such cleats can be angled to divert debris away from chassis 6.

Flippers 14 can be can be rotated about axle 16. Flippers 14 can be rotated to a forward "stowed" between a top portion and a bottom portion of the tracks and position next to chassis 6 (see the flipper position in FIG. 3A). Alternatively, flippers 14 can be rotated to a rearward trailing position (e.g., substantially horizontal and extending behind robot 2) to prevent catching of the ends of flippers 14 on terrain, for example in tall grass. In some embodiments, to prevent possible damage, flippers 14 can automatically return to a stowed position when robot 2 detects that it is in free fall.

FIGS. 3A-3H schematically illustrate a sequence of obstacle surmounting steps for a robot 300. Robot 300 comprises a first end 310 comprising a first pair of wheels, a second end 315 comprising a second pair of wheels, and a center of gravity 340 between the first end and the second end. Robot 300 also comprises at least one articulated arm 325 coaxial with the first pair of wheels such that the first pair of wheels and the arm can rotate freely relative to each other, and a driven support surface 330 (such as, for example, tracks 12) surrounding the first and second pairs of wheels.

Figures 3A, 3B:
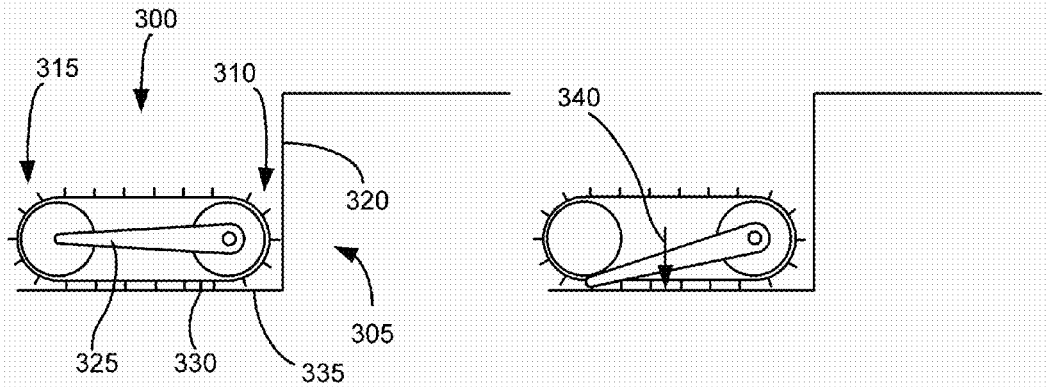
FIGS. 3A-3H schematically illustrates a sequence of obstacle surmounting maneuvers.
Figures 3C, 3D:
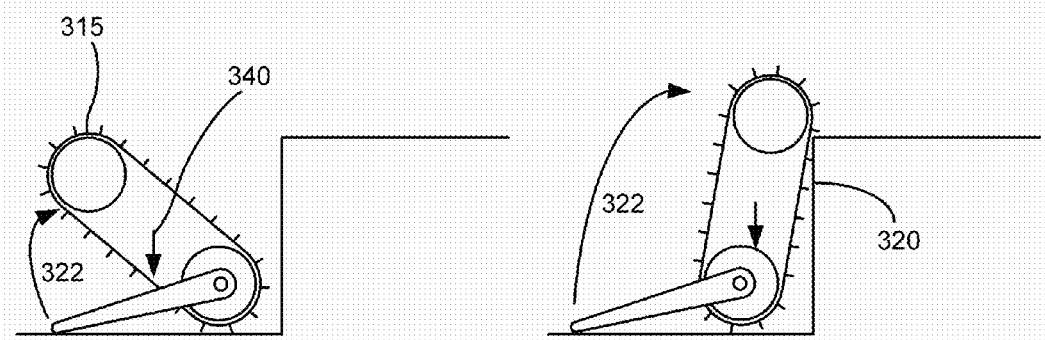

As illustrated in FIG. 3A, the support surface 330 of the robot is driven to propel the robot along a ground surface 335 until the first end 310 of the robot contacts an obstacle 305. The first end 310 can contact, for example, a riser 320 or front face of an obstacle 305. When the robot detects contact with the obstacle, the arm 325 is rotated in a first direction toward the ground surface 335 to contact the ground surface (FIG. 3B). When the arm is in contact with the ground 335, the arm 325 is further rotated in the first direction to lift the second end 315 of the robot over the center of gravity 340 (FIGS. 3C to 3D). As the arm 325 is further rotated in the first direction, the second end 315 of robot 300 is lifted over the center of gravity 340 until the second end contacts an upper portion of riser 320 (FIG. 3D).

Figure 3E:
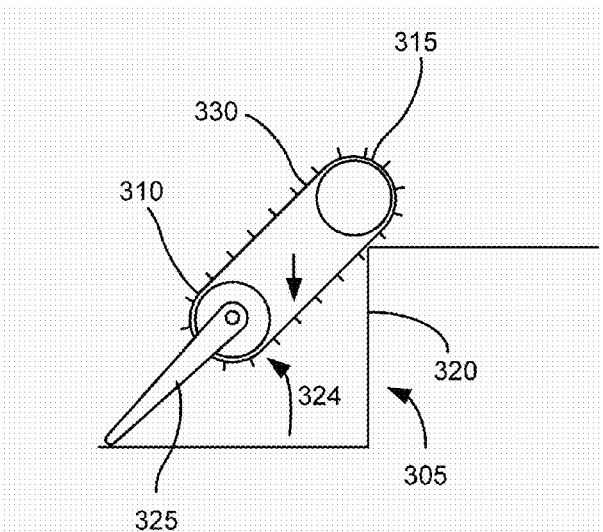

When the second end 315 contacts the upper portion of the riser 320, the arm 325 is rotated in the first direction to lift the first end 310 of robot 300 above the ground (FIG. 3E). In addition, the support surface 330 is driven to propel the second end 315 up and over the obstacle riser 320. The support surface can be driven while the arm is rotated to lift the first end from the ground, or the support surface can be driven after the arm is rotated to lift the first end from the ground. In addition, adjustments can be made based on the size of the obstacle and the angle of the robot relative to the ground and to the obstacle, such that the arm 325 can be rotated an additional amount, alone or together with the driving of the support surface, to propel the second end of the robot 300 to surmount the obstacle.

Figure 3F:
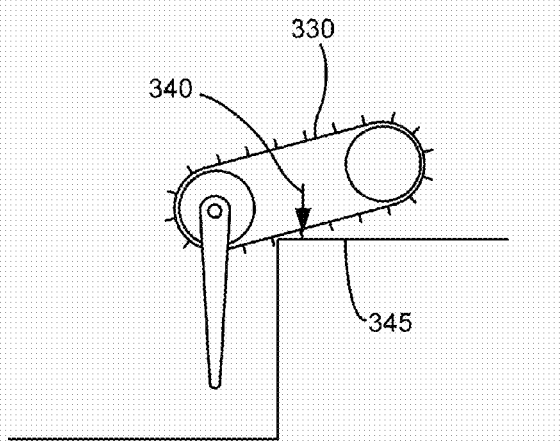
Figure 3G:
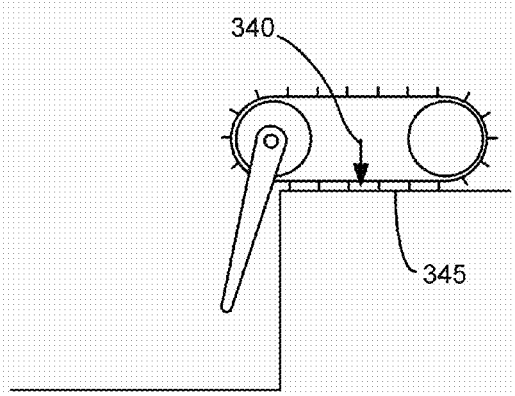
Figure 3H:
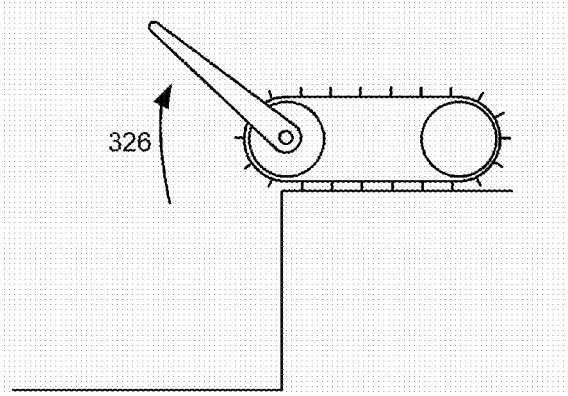

As illustrated in FIG. 3F, the support surface 330 is driven to propel the second end of the robot up and over the obstacle riser until the center of gravity 340 of the robot surmounts the obstacle. When the center of gravity 340 of the robot 300 surmounts the obstacle, the second end 315 of the robot 300 descends until the support surface 330 contacts a top surface, or aspects of a top surface, of the obstacle, for example at a top surface 345 of the obstacle 305 (FIG. 3G). The arm 325 is then rotated in a second direction to clear the riser 320 and/or the top surface 345 of the obstacle (FIG. 3H). In certain embodiments, the arm 325 can be rotated in the second direction until it trails the robot, i.e., extending outwardly from the first end 310 of the robot such that its longitudinal axis is parallel to a longitudinal axis of the robot chassis. The arm 325 can also be rotated in the second direction until it reaches a "stowed" position substantially aligned with the side of the robot. Surmounting the illustrated stair-like obstacle can be defined as, for example, the moment when the robot's center of gravity passes over the top of the stair riser. Those skilled in the art will appreciate the meaning of surmount with respect to less regular objects, and will understand that more than one aspect or portion of an obstacle may need to be surmounted to successfully travel over the obstacle.

Figure 4:
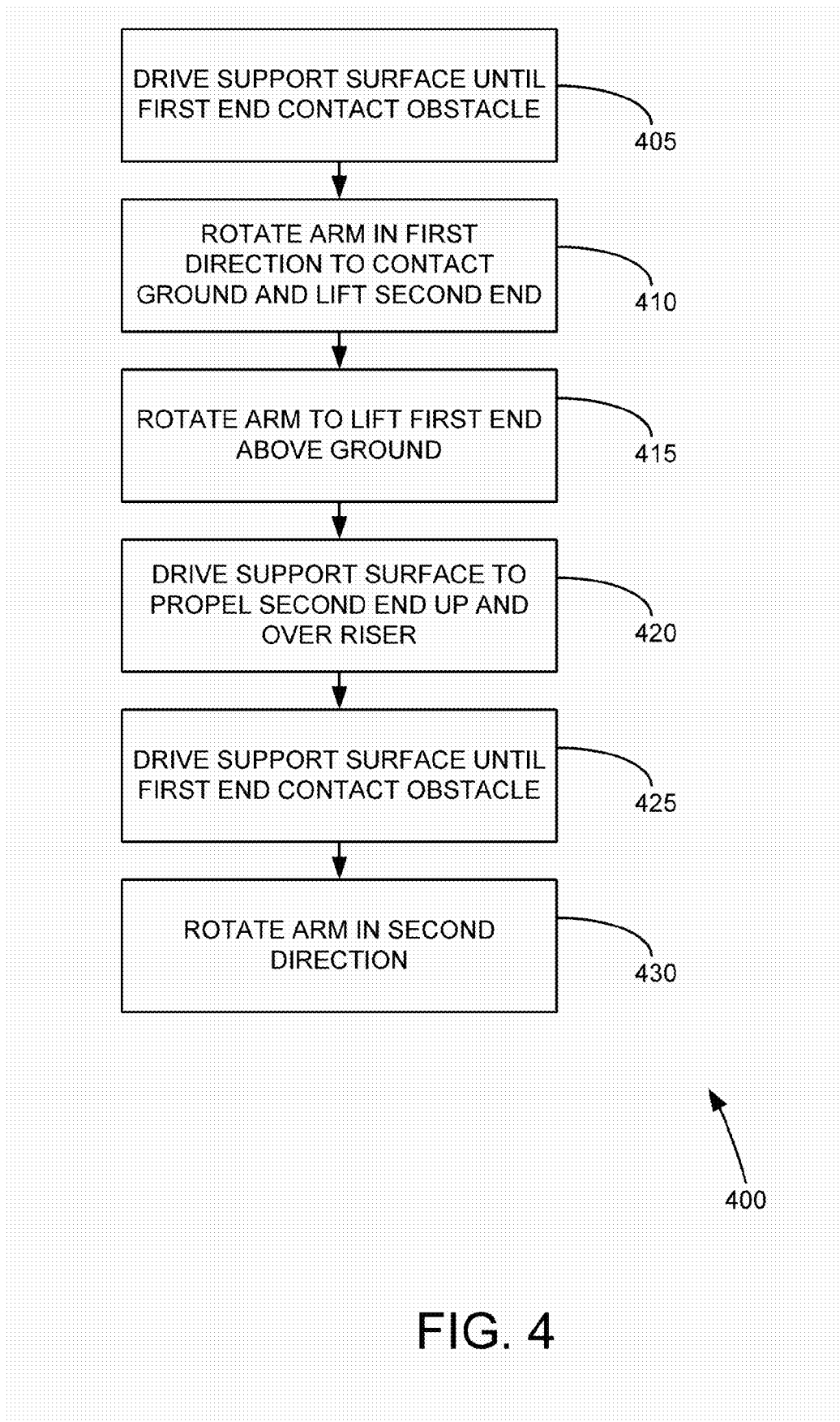
FIG. 4 is a flowchart showing an exemplary obstacle surmounting method in accordance with the present teachings.

FIG. 4 is a flowchart illustrating an exemplary obstacle surmounting method, with reference to FIGS. 3A-3H. In operation 405, the support surface 330 of the robot is driven to propel the robot along a ground surface 335 until the first end 310 of the robot contacts an obstacle 305. When the robot detects contact with the obstacle, in operation 410 the articulated arm 325 is rotated in a first direction toward the ground surface 335 to contact the ground surface. When the arm is in contact with the ground 335, the arm 325 is further rotated in the first direction to lift the second end 315 of the robot over the center of gravity 340. As the arm 325 is further rotated in the first direction, the second end 315 is lifted over the center of gravity 340 until the second end contacts an upper portion of riser 320.

In operation 415, the arm 325 is rotated in the first direction to lift the first end 100 above the ground when the second end 315 contacts the upper portion of the riser 320. In operation 420, the support surface 330 is driven to propel the second end 315 up and over the obstacle riser 320. As noted above, the support surface can be driven while the arm is rotated to lift the first end from the ground, or the support surface can be driven after the arm is rotated to lift the first end from the ground. In addition, adjustments can be made based on the size of the obstacle and the angle of the robot relative to the ground and to the obstacle, such that the arm can be rotated an additional amount, alone or together with the driving of the support surface, to propel the second end of the robot to surmount the obstacle.

In operation 425, the support surface 330 is driven to propel the second end of the robot up and over the obstacle riser until the center of gravity 340 of the robot surmounts the obstacle. When the center of gravity of the robot surmounts the vehicle, in operation 430 the arm 325 is then rotated in a second direction to clear the riser 320 and/or the top surface 345 of the obstacle. The arm 325 can be rotated in the second direction until it trails the robot, or the arm can be rotated until it is stowed substantially along the side of the robot. The arm can also be rotated to any position in between its ground-contacting position and the stowed position as the robot crests the obstacle riser and drives forward. Indeed, in various embodiments, the arm 325 begins rotating in the second direction after the robot's center of gravity has surmounted the riser and continues rotating as the robot drive forward along the top surface.

FIGS. 5A-5F schematically illustrate a sequence of balancing and maneuvering steps for a mobile robot 500. Robot 500 comprises a first end 505 having a first pair of wheels, a second end 510 having a second pair of wheels, and a track 525 which surrounds the first and second pairs of wheels. Robot 500 also comprises an articulated arm 515 coaxial with the first pair of wheels at the first end 505. The first pair of wheels and the arm 515 can rotate freely about their axes relative to each other.

Figure 5A:
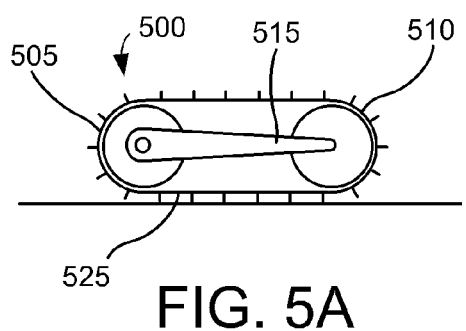
FIGS. 5A-5F schematically illustrate a sequence of balancing and maneuvering steps.
Figure 5B:
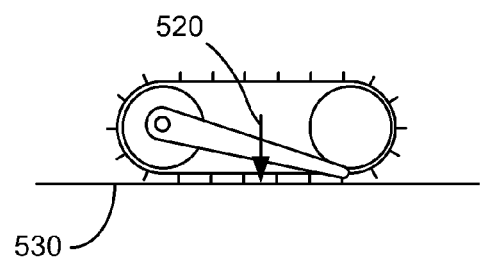
Figure 5C:
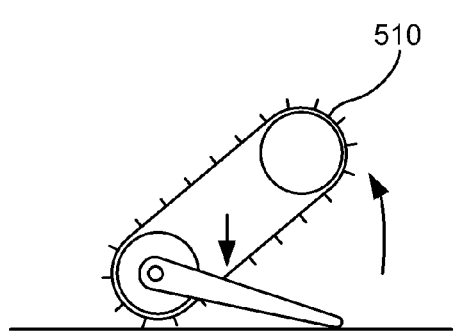
Figure 5D:
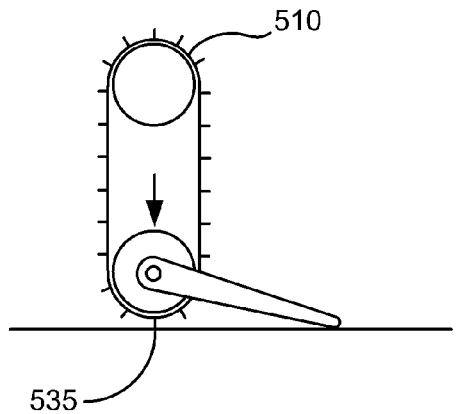
Figure 5E:
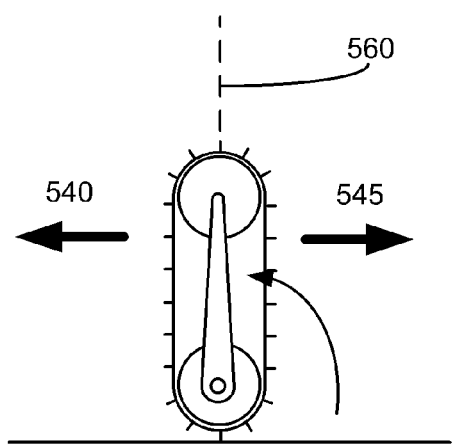

As illustrated in FIG. 5B, the arm 515 rotates in a first direction to contact the ground 530. When in contact with the ground, the arm is further rotated to raise the second end 510 of the robot 500 above the ground (FIG. 5C). The robot 500 continues to rotate the arm 515 in the first direction until the second end 510 of the robot is substantially above the center of gravity 520 of the robot 500 (e.g., when the robot chassis has become vertical as shown in FIG. 5D). Based on data from a sensor such as an accelerometer or gyroscope housing in or on the robot 500, the robot can determine its relative orientation, for example the orientation of the chassis relative to the ground, or the relative orientation of the pairs of wheels. Using the data from the sensor, the robot continues to rotate the arm 515 in the first direction until the second end second end 510 is positioned substantially above the center of gravity such that the robot can balance on the portion 535 of the track 525 surrounding the first pair of wheels of the first end 505 (FIG. 5D). In other words, a gyroscope or other suitable sensor can be used to tell when the robot chassis has become vertical. When the robot is balancing on track portion 535, the robot can rotate the articulated arm 515 in a second direction, opposite to the first direction, to disengage the arm from the ground (FIG. 5E). The arm can be rotated, for example, until it is in a stowed position substantially along the side of the robot, or it can be rotated to any other position along the sweep of its rotation. Indeed, as needed, the arm can be rotated to assist balancing of the robot.

Figure 5F:
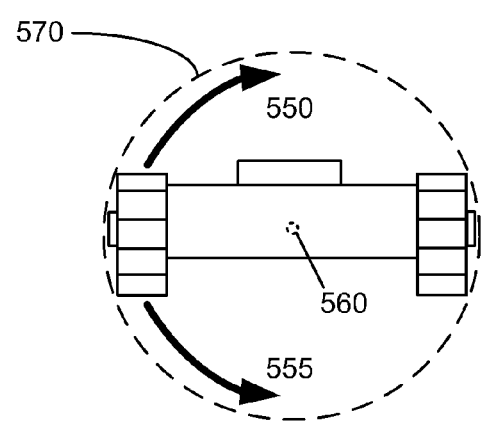

As illustrated in FIG. 5E, while maintaining the second end 510 substantially above the center of gravity 520, the track 525 can be driven to move the robot along the ground in a first direction 540 or a second direction 545 with only the track portion 535 engaging the ground. In addition, while the robot is balancing on the track portion 535, the robot 500 can be driven to rotate in a first rotational direction 550 or in a second rotational direction 555, substantially about an axis of rotation 560. The axis of rotation can also be defined as a longitudinal axis of the robot 500, and may pass through the center of gravity 520 of the robot 500. As illustrated in FIG. 5F, when the robot is rotated in either direction 550 or 555, the robot rotates within a sweep volume 570 that can be ideally, but is not necessarily, defined by the track 525. The robot's sweep volume 570 may increase, for example, if the robot loses its balance or the chassis becomes non-vertical while rotating.

Figure 6:
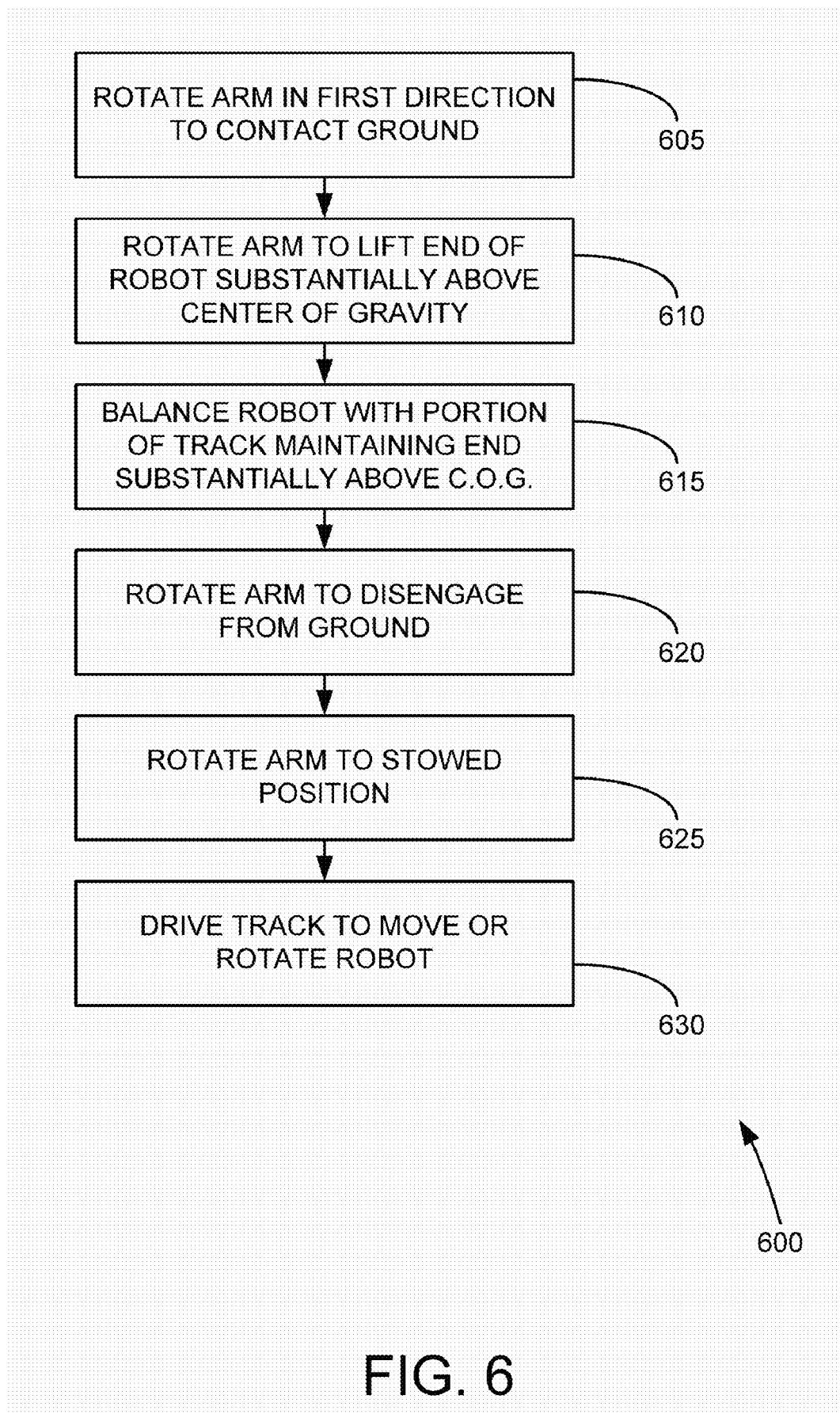
FIG. 6 is a flowchart showing an exemplary balancing and maneuvering method in accordance with the present teachings.

FIG. 6 is a flowchart illustrating an exemplary balancing and maneuvering method 600 with reference to FIGS. 5A-5F. In operation 605, the arm 515 rotates in a first direction to contact the ground 530, and when in contact with the ground the arm is further rotated to raise the second end 510 of the robot above the ground. In operation 610, the robot continues to rotate the arm 515 in the first direction until the second end 510 of the robot is substantially above the center of gravity 520. Using sensor data to determine the relative orientation of the robot, the robot continues to rotate the arm 515 in the first direction until the second end second end 510 is positioned substantially above the center of gravity such that the robot can balance on a portion 535 of the track 525 surrounding the first pair of wheels of the first end 505 (operation 615). In operation 620, when the robot balances on the track portion 535, the robot rotates the articulated arm 515 in a second direction, opposite to the first direction, to disengage the arm from the ground. The arm can be rotated until it is in a stowed position substantially along the side of the robot, or it can be rotated to any other position along the sweep of its rotation.

In operation 630, while maintaining the second end 510 substantially above the center of gravity 520, the track 525 can be driven to move the robot along the ground in a first direction 540 or a second direction 545 using only the track portion 535. In addition, the track 525 can be driven to rotate the robot about an axis of rotation, such as an axial line extending from the first end to the second end. When the robot is rotated about its axis of rotation, the robot can rotates substantially within a sweep volume 570 defined by the track 525.

Figure 7A:
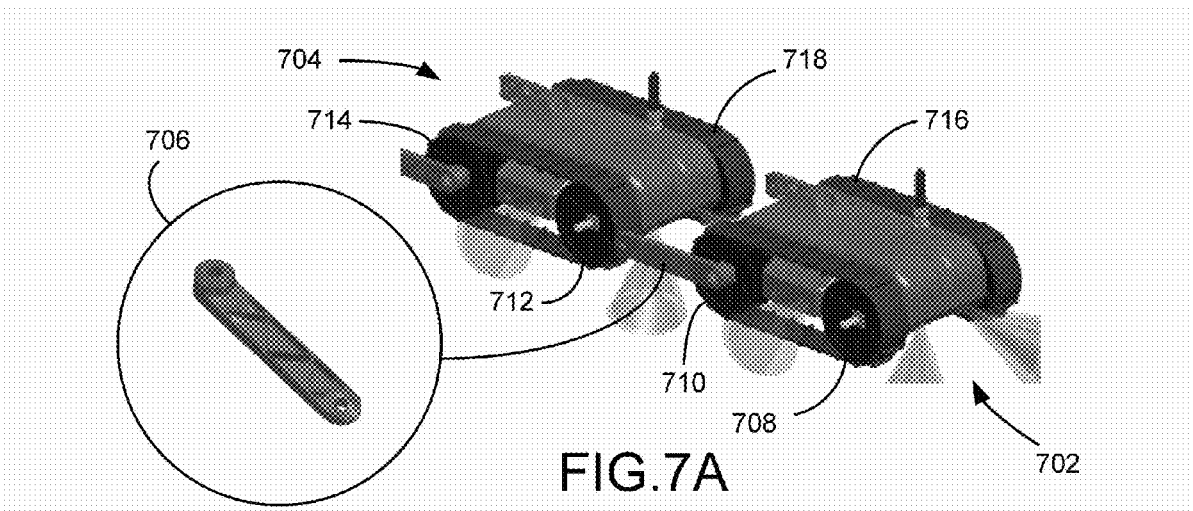
FIG. 7A illustrates an exemplary embodiment of a mobile robot system including two robots and a manipulable arm that can be used to releasably attach the two robots to each other, for example for surmounting obstacles as shown in FIGS. 7B-7D.

FIG. 7A illustrates an exemplary embodiment of a mobile robot system including two robots and a manipulable arm that can be used to releasably attach the two robots to each other, for example for surmounting obstacles as illustrated in FIGS. 7B-7N, which schematically illustrate an exemplary obstacle surmounting maneuver of a mobile robot system.

The exemplary robot system illustrated in FIG. 7A comprises a first robotic vehicle 702, a second robotic vehicle 704, and a connecting member 706. Robotic vehicle 702 comprises a first end 724 having a first pair of wheels 708 and a second end 726 having a second pair of wheels 710, and a driven support surface 716, such as a track surrounding the first and second pairs of wheels. The second robotic vehicle 704 comprises a first end 728 having a first pair of wheels 712 and a second end 730 having a second pair of wheels 714, and a driven support surface 718 such as a track surrounding the first and second pairs of wheels. In the illustrated embodiment, the connecting member 706 is connected to each robotic vehicle coaxially with pair of wheels 710 of the first robotic vehicle and pair of wheels 712 of the second robotic vehicle, such that the connecting member and the pairs of wheels can rotate freely relative to each other.

The connecting member 706 can be driven by the first robotic vehicle 702 to rotate along the axis of the pair of wheels 710. In certain embodiments of the present teachings, the connecting member 706 can also be driven by the second robotic vehicle 704 to rotate along the axis of the pair of wheels 712, although this need not be the case. When the robotic vehicles 702 and 704 are connected to the connecting member 706, the vehicles are oriented end-to-end, and the support surfaces 716 and 718 can be driven to propel the vehicles forward with the front of the system being the first end 724 of the first vehicle 702 or rearward with the rear of the system being the second end 730 of the second vehicle 704.

Figure 7B:
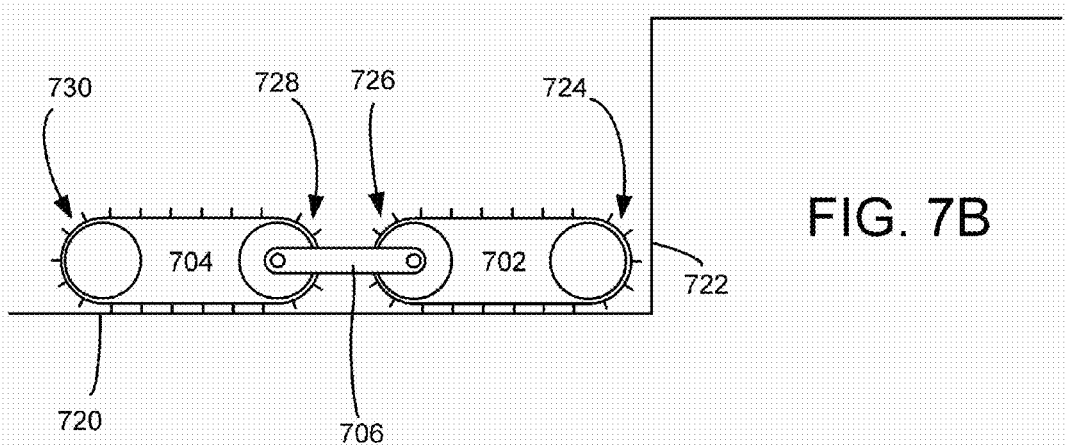

The first and second robotic vehicles 702, 704 can behave cooperatively to surmount an obstacle as shown in FIGS. 7B-7M. At least one of the support surfaces 710, 714 is driven to move the first and second vehicles 702, 704 along the ground 720 toward an obstacle 722 until the first vehicle contacts the obstacle (FIG. 7B). Alternatively, at least one of the support surfaces 710, 714 can be driven to move the first and second vehicles 702, 704 toward the obstacle 722 until the first vehicle detects the obstacle, for example, with known obstacle detection sensors.

Figure 7C:
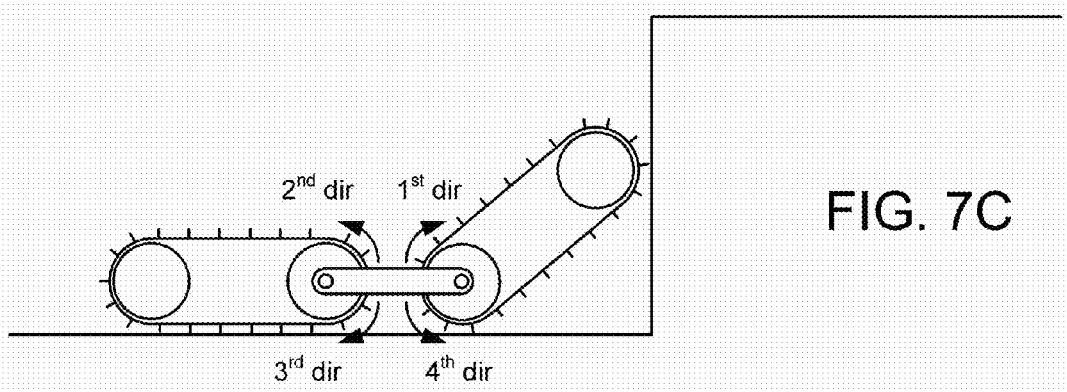

At least one of the support surfaces 716, 718 (which are cleated tracks in the illustrated embodiment) is driven to propel the first vehicle to begin to surmount the obstacle (FIG. 7C). In addition, the first vehicle 702 can drive the connecting member 706 to rotate in a first direction, which raises the first end 724 of the first vehicle 702 from the ground 720. The first vehicle may rotate the connecting member 706 to raise the first end 724 before the first end 724 contacts the obstacle 722, or after the first end contacts the obstacle.

Then, as illustrated in FIG. 7D, while the first and second support surfaces are driven to propel the vehicles toward the obstacle, the first vehicle 702 further rotates the connecting member 706 in the first direction, raising the first robotic vehicle 702 above the ground. In addition, or alternatively, the second vehicle 704 drives the connecting member 706 to rotate in a second direction, to further raise the first vehicle 702 above the ground as the first vehicle ascends the obstacle.

Referring to FIG. 7E, as the first vehicle 702 begins to surmount the obstacle, the second vehicle can rotate the connecting member 706 in a third direction which is opposite the second direction (see FIG. 7C), which serves to raise the first end 728 of the second vehicle 704 above the ground and to aid the first vehicle 702 in surmounting the obstacle. In addition, or alternatively, the first vehicle 702 can rotate the connecting member 706 in a fourth direction which is opposite the first direction (see FIG. 7C) to raise the first end 728 of the second vehicle 704 above the ground. The support surfaces 716, 718 can be driven continuously to propel the first and second vehicles to surmount the obstacle during this process.

Figure 7G:
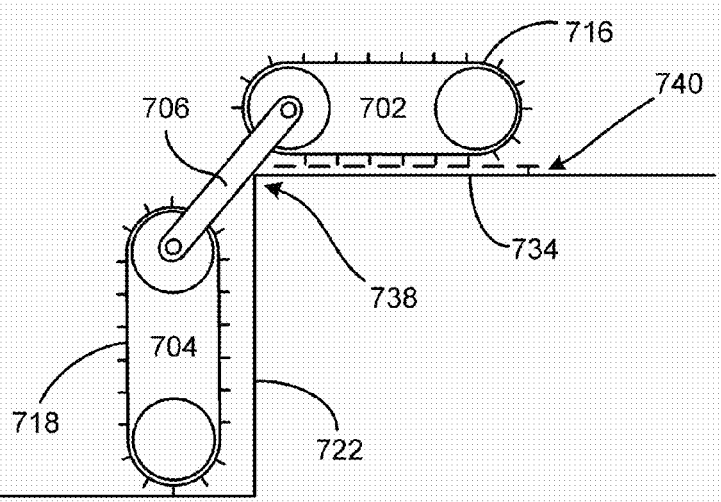

When the first vehicle surmounts the obstacle, the front end 724 can descend until it engages a top surface of the obstacle 734 (FIG. 7F). In certain instances, as shown in FIG. 7F, the second end 726 of the first vehicle 702 may be supported through the connecting member 706 above the top surface of the obstacle such that the longitudinal axis of the first vehicle 702 and the top surface of the obstacle form a first angle 736. At least one of the support surfaces 716, 718 is then driven to move the robot system along the obstacle until the connecting member 706 contacts the obstacle at a point of contact 738 (FIG. 7G).

Figure 7H:
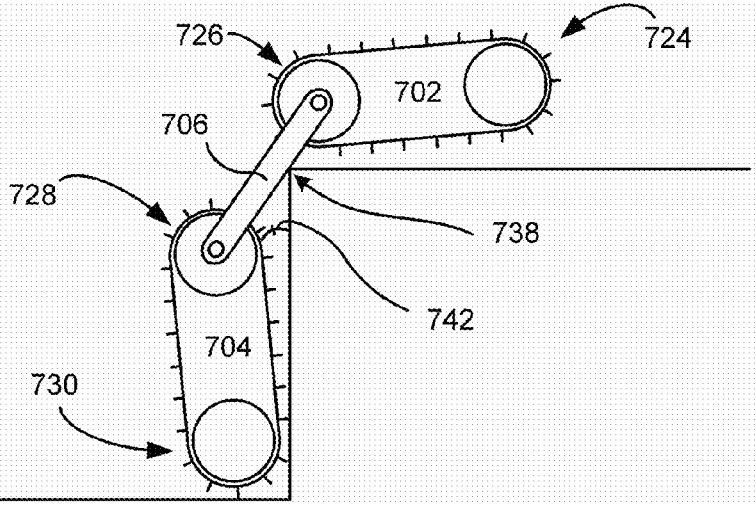

In the illustrated embodiment, when the connecting member 706 contacts the obstacle, the second vehicle 704 continues to drive its support surface 718 to propel the second vehicle toward the obstacle. In certain instances, the first and second vehicles can maintain their relative orientations to the connecting member, i.e., neither the first vehicle nor the second vehicle may rotate the connecting member. In other instances, as the second vehicle approaches the obstacle. the first vehicle and/or the second vehicle may rotate the connecting member. As the second vehicle approaches the obstacle, the first vehicle 702 may be raised above the top surface of the obstacle by a first height 740 due to the connecting member pivoting about the point of contact 738 as shown in FIG. 7G. The height 740 is based at least on the length of the second vehicle, the length of the connecting member, and the height of the obstacle. The second vehicle drives its support surface 718 until the support surface 718 contacts the obstacle (FIG. 7H). The first end 728 of the second vehicle 704 may be disengaged from the obstacle while the second end 730 of the second vehicle is in contact with the obstacle such that the longitudinal axis of the second vehicle forms an angle 742 with the vertical wall of the obstacle.

Figure 7I:
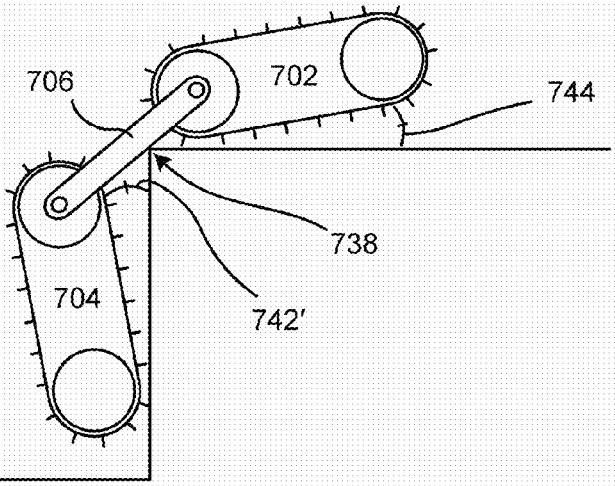

Then, as illustrated in FIG. 7I, the connecting member is rotated one or more times until the first vehicle 702 re-engages with the obstacle. The connecting member is rotated by at least one of the first vehicle 702 in the first direction and the second vehicle 704 in the third direction until the first support surface engages the top surface 734 of the obstacle the obstacle. The first end 724 of the first vehicle may, in some instances, remain disengaged from the top surface of the obstacle while the second end 726 of the first vehicle engages the top of the obstacle such that the top surface of the obstacle and the longitudinal axis of the first vehicle form an angle 744. As the connecting member is rotated, the first end 728 of the second vehicle 704 may separate farther from the obstacle to form a second angle 742' between the obstacle and the longitudinal axis of the second vehicle which is greater than angle 742.

Figure 7J:
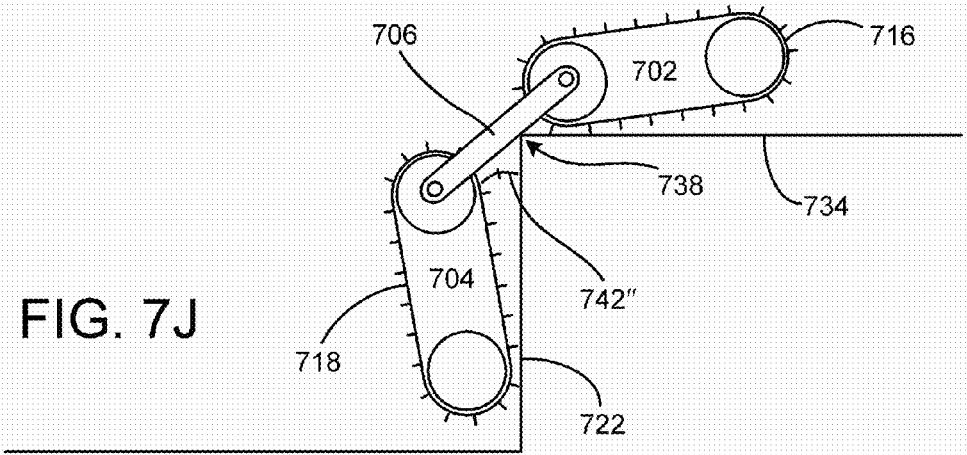
Figure 7K:
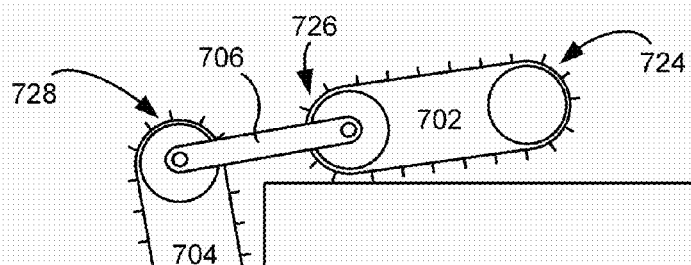
Figure 7L:
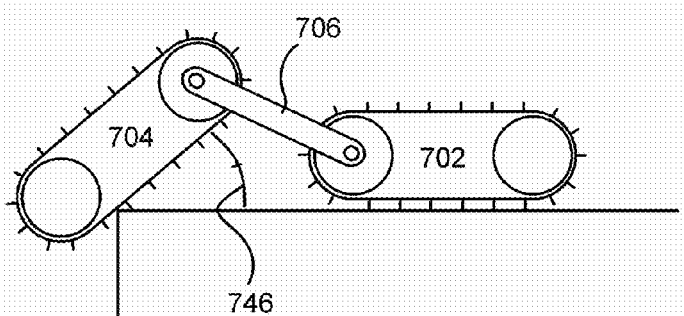

At least one of the support surfaces 716, 718, and preferably both of the support surfaces 716, 718, can be driven to advance the vehicles in a direction to surmount the obstacle as the connecting member is rotated as described above. As the connecting member is rotated, the first end 728 of the second vehicle 704 may continue to separate farther from the obstacle to form a third angle 742" which is greater than the second angle 742' (FIG. 7J). As the first end 728 of the second vehicle 704 begins to rise above the top of the obstacle, the connecting member disengages from the point of contact 738 with the obstacle (FIG. 7K). The support surfaces 716, 718 continue to be driven to advance the robot system to surmount the obstacle as the connecting member is rotated in at least the first direction by the first vehicle and in the third direction by the second vehicle so that the second vehicle surmounts the obstacle (FIG. 7L).

One skilled in the art will foresee that the connecting member 706 may contact portions of an obstacle at various stages of surmounting an obstacle, and that not all such contact will require the steps as described above.

Figure 7M:
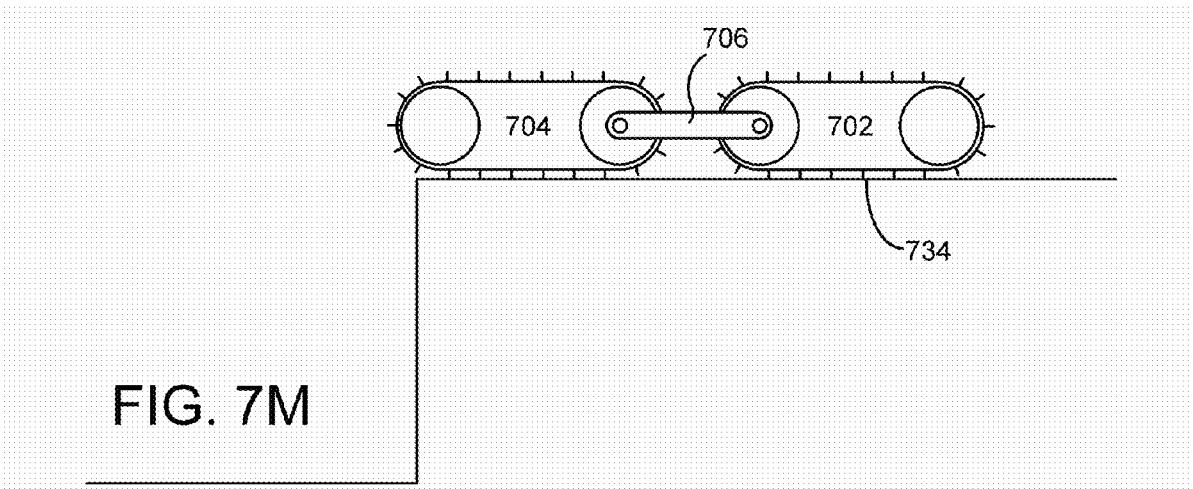

As the second vehicle 704 surmounts the obstacle, the first end 728 of the second vehicle 704 may be supported above the top surface of the obstacle by the connecting member by an angle 746. When the second vehicle 704 has surmounted the obstacle, the support surfaces 716, 718 are driven to continue to advance the vehicles, and the connecting member is rotated by at least one of the first vehicle in a fourth direction which is opposite to the first direction, and by the second vehicle in the second direction, until the first end 728 of the second vehicle 704 engages with the obstacle (FIG. 7M).

Figure 7N:
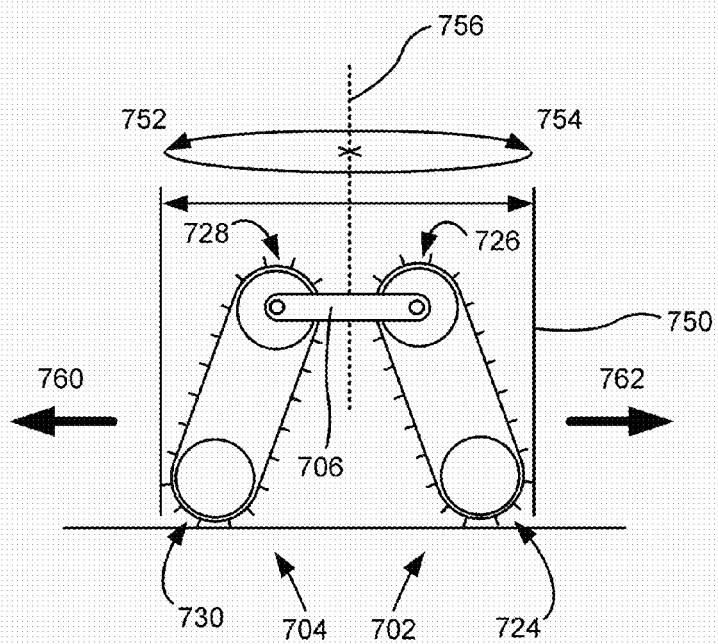

As illustrated in FIG. 7N, the robot system is also capable of balancing on the first end 724 of the first vehicle and the second end 730 of the second vehicle. The first vehicle 702 rotates the connecting member 706 in the fourth direction and the second vehicle 704 rotates the connecting member in the third direction, raising the second end 726 of the first vehicle and the first end of the second vehicle from the ground. The connecting member 706 maintains a separation between the second end 726 and the first end 728 while the second end 726 and the first end 728 are maintained in an elevated position, as illustrated in FIG. 7N. This elevated orientation may serve, for example, to raise an antenna or a sensor of a vehicle higher above the ground.

Data from a sensor such as a gyroscope, which can be disposed in the first vehicle, the second vehicle, or both, can also be used to maintain balance of the system and determine an orientation of a vehicle. The first and second driven support surfaces 716, 718 can be driven to rotate the robot system in a first rotational direction 752 or in a second rotational direction 754. Rotation occurs around an axis of rotation 756 which is a line substantially perpendicular to the ground between the first end 728 and the second end 726. In addition, the driven support surfaces can be driven to propel the robot system in a first linear direction 760 or a second linear direction 762.

The connector 706 can comprise, for example, a flipper that has certain known features but that additionally can be mounted to another robotic vehicle's axle in a manner that would allow the linked vehicles to surmount an obstacle as described above. The connector 706 is preferably thinner than commonly-used flippers, to give the robotic vehicles more clearance when positioned as shown in FIGS. 7G-7J.

Figure 8:
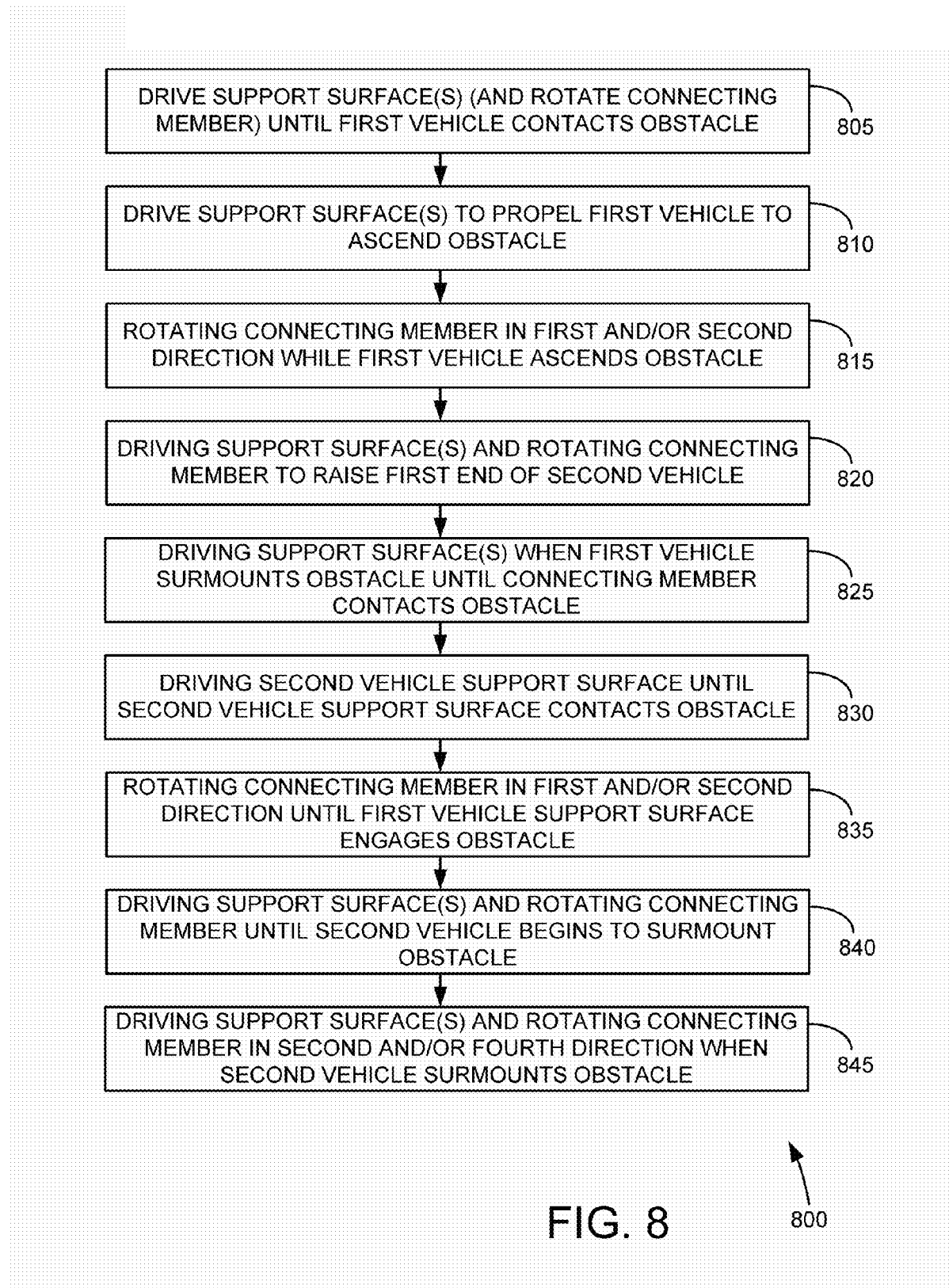
FIG. 8 is a flowchart showing an exemplary obstacle surmounting method for a robot system in accordance with the present teachings.

FIG. 8 is a flowchart illustrating an exemplary obstacle surmounting method of a robot system with reference to FIGS. 7A-7N. In operation 805, at least one of the support surfaces 716, 718 is driven to move the first and second vehicles 702, 704 along the ground 720 toward an obstacle 722 until the first vehicle contacts the obstacle. Alternatively, at least one of the support surfaces 716, 718 can be driven to move the first and second vehicles 702, 704 toward the obstacle 722 until the first vehicle detects the obstacle, for example, with known obstacle detection sensors. In operation 810, at least one of the support surfaces 716, 718 is driven to propel the first vehicle 702 to begin to surmount the obstacle. The first vehicle 702 also drives the connecting member 706 to rotate in a first direction to raises the first end 724 of the first vehicle 702 from the ground 720. The first vehicle may rotate the connecting member to raise its first end 724 before the first end 724 contacts the obstacle 722, or after the first end contacts the obstacle. While the first and second support surfaces are driven to propel the vehicles toward the obstacle, the first vehicle 702 further rotates the connecting member 706 in the first direction, raising the first robotic vehicle 702 above the ground. In addition, or alternatively, the second vehicle 704 drives the connecting member 706 to rotate in a second direction, to further raise the first vehicle 702 above the ground as the first vehicle ascends the obstacle.

In operation 820, as the first vehicle 702 begins to surmount the obstacle the second vehicle rotates the connecting member 706 in a third direction which is opposite the second direction to raise the first end 728 of the second vehicle 704 above the ground. In addition, or alternatively, the first vehicle 702 can rotate the connecting member 706 in a fourth direction which is opposite the first direction to raise the first end 728 of the second vehicle 704 above the ground. The support surfaces 716, 718 can be driven continuously to propel the first and second vehicles to surmount the obstacle.

In operation 825, at least one of the support surfaces 716, 718 is driven to move the robot system to surmount the obstacle until the connecting member contacts the obstacle at a point of contact 738. When the connecting member 706 contacts the obstacle, the second vehicle 704 continues to drive the support surface 718 while the first and second vehicles maintain their relative orientations to the connecting member, i.e., neither the first nor second vehicles rotate the connecting member. In operation 830, the second vehicle drives its support surface 718 until the support surface 718 contacts the obstacle.

In operation 835, the connecting member is rotated until the first vehicle 702 re-engages with the obstacle. The connecting member is rotated by at least one of the first vehicle 702 in the first direction and the second vehicle 704 in the third direction until the first support surface engages the top surface 734 of the obstacle the obstacle. As the first end 728 of the second vehicle 704 begins to rise above the top of the obstacle, the connecting member disengages from the point of contact 738 with the obstacle.

In operation 840, the support surfaces 716, 718 continue to be driven to advance the robot system over the obstacle as the connecting member is rotated in at least the first direction by the first vehicle and in the third direction by the second vehicle so that the second vehicle surmounts the obstacle.

When the second vehicle 704 has surmounted the obstacle, in operation 845, the support surfaces 716, 718 are driven to continue to advance the vehicles, and the connecting member is rotated by at least one of the first vehicle in a fourth direction which is opposite to the first direction, and by the second vehicle in the second direction, until the first end 728 of the second vehicle 704 engages with the obstacle.

FIGS. 9A-9D illustrate an exemplary embodiment of a robot system including more than two robotic vehicles. Robot system 900 comprises a plurality of robotic vehicles A-F, each comprising a first end 905 having a first pair of wheels, a second end 910 having a second pair of wheels, and a driven support surface 915 movably connected to each robotic vehicle and surrounding the first and second pairs of wheels of each robotic vehicle. The driven support surface can propel the robotic vehicle in forward and rearward directions. The driven support surface 915 can be a flexible track trained about a front wheel and a rear wheel. Each robotic vehicle is connected to other robotic vehicles via a connecting member 930. The connecting members 930 are rotatably connected to the first end of each robotic vehicle to be coaxial with the first pair of wheels, and to the second end of another robotic vehicle to be coaxial with the second pair of wheels of the other robotic vehicle. Thus, for example, first end 905 of robotic vehicle E is connected by a connecting member 930 to the second end of robotic vehicle D. The connecting member 930 is rotatable about the axis of the first pair of wheels and the axis of the second pair of wheels, and can be driven to rotate by at least one of the robotic vehicles to which it is connected. The connecting member can rotate freely relative to each of the wheels with which it is coaxial.

Figure 9A:
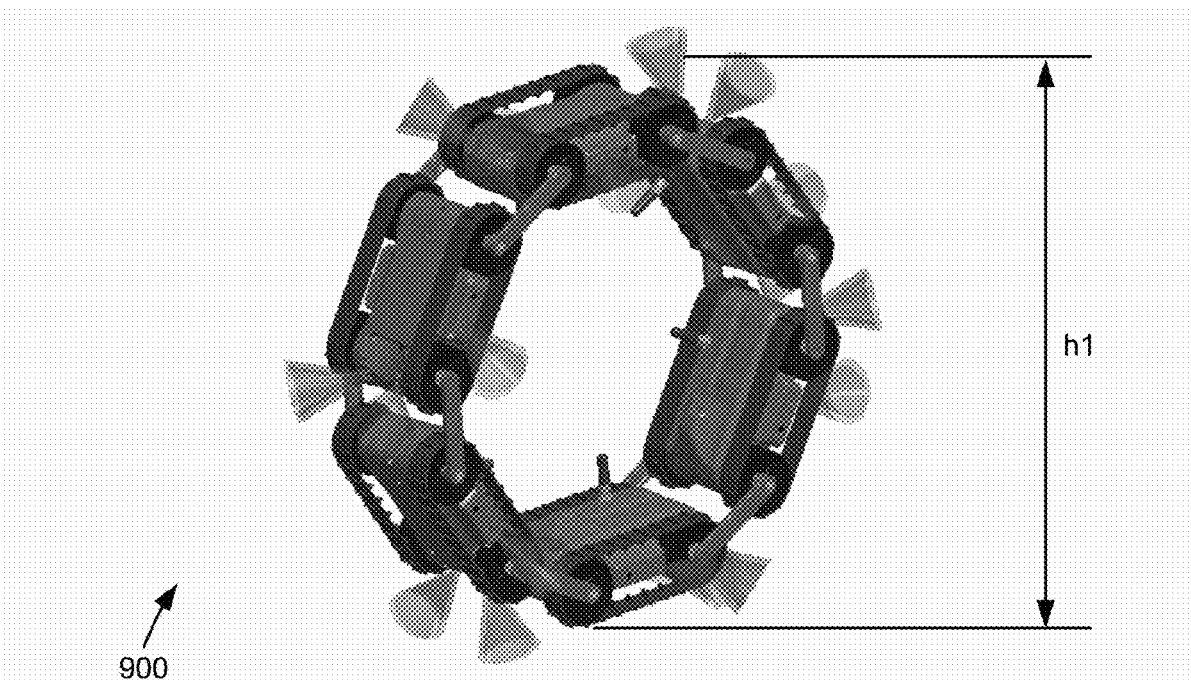
Figure 9B:
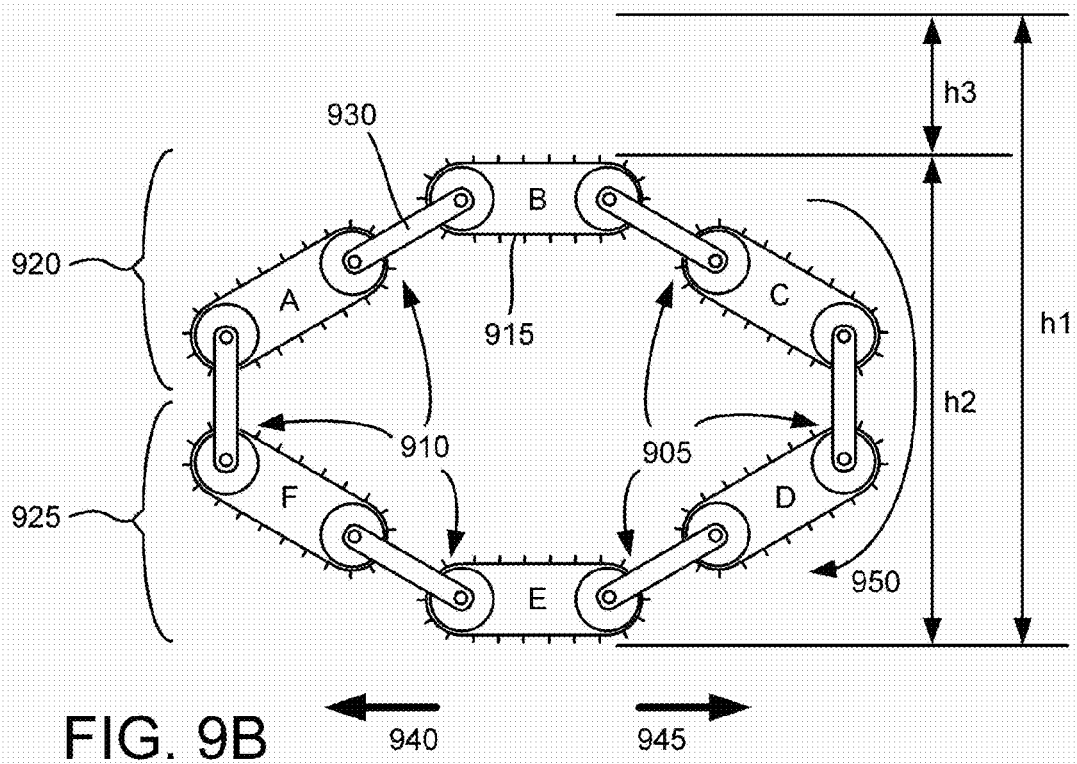

The robot system illustrated in FIGS. 9A-9D comprises six robotic vehicles. In FIG. 9A, the robotic vehicles are arranged in an almost circular shape. In FIG. 9B, the robotic vehicles are arranged in a long oval-type shape. In FIG. 9C, the robotic vehicles are arranged in a rectangular configuration, and in FIG. 9D, the robotic vehicles are arranged in a tall oval-type shape. In FIG. 9B, the robotic vehicles have been divided into an upper group 920 and a lower group 925. One skilled in the art will appreciate that the constituents of the upper and lower groups will change as the robotic vehicles change position.

The driven support surfaces 915 of each robotic vehicle can be driven to propel the robot system to surmount an obstacle. For example, the driven support surfaces 915 can be driven to propel the vehicles in a first direction 940 or in a second direction 945 to surmount an obstacle by rolling the robot system over the obstacle when the robot system contacts the obstacle. For example, if the support surfaces 915 are driven to propel the robot system 900 in the direction 905, and the robot system encounters an object sufficiently small to contact robotic vehicle D, the mass of the robot system 900 can cause the robot system to trip and roll over the obstacle as a unit in a clockwise direction 950 (as viewed in FIG. 9B). Each robotic vehicle can be equipped with one or more sensors, transceivers, antennas, and/or payloads. Sensors can include cliff sensors, wall sensors, and collision sensors, as well as sensors such as an accelerometer or gyroscope to permit the robotic vehicle to detect an acceleration vector and to determine its relative orientation.

The robot system 900 can be made to assume an approximately wheel-shaped or circular grouping as shown in FIG. 9A with a height h1. In this grouping the robotic vehicles A-F each have similar orientations relative to the connecting arms 930 and to the other robotic vehicles in the system 900. The plurality of connecting members are rotatable by at least one of the robotic vehicles to which they are connected to change the orientation of the robotic vehicles A-F with respect to each other, thus causing the overall system 900 to change its shape. Raising the upper group 920 of robotic vehicles would allow, for example, the raising of a sensor or an antenna attached to a robot in the upper group higher above the ground, for example above the level of an obstacle. When the upper group 920 is lowered as distance of h3, for example as illustrated in FIG. 9B, the height of the upper group 920 can be lowered to a height of h2 which is less than height h1. The upper group 920 can also be lowered a distance h5 to a height h4, such that the height h4 is equal to or less than the distance h5, for example to allow the system 900 to pass under an overlying obstacle. Further, the upper group 920 can be raised above height h1 by a distance h7 to a height h6 as shown in FIG. 9D, to raise a sensor as discussed above. In some instances, the upper group can again be lowered, for example, to allow the robot system to fit below an obstacle or within a passage. The upper group may also be lowered, for example, to fit below the level of a window to avoid being seen, or to hide below a window and raise up periodically to gather data with certain sensors.

Figure 10:
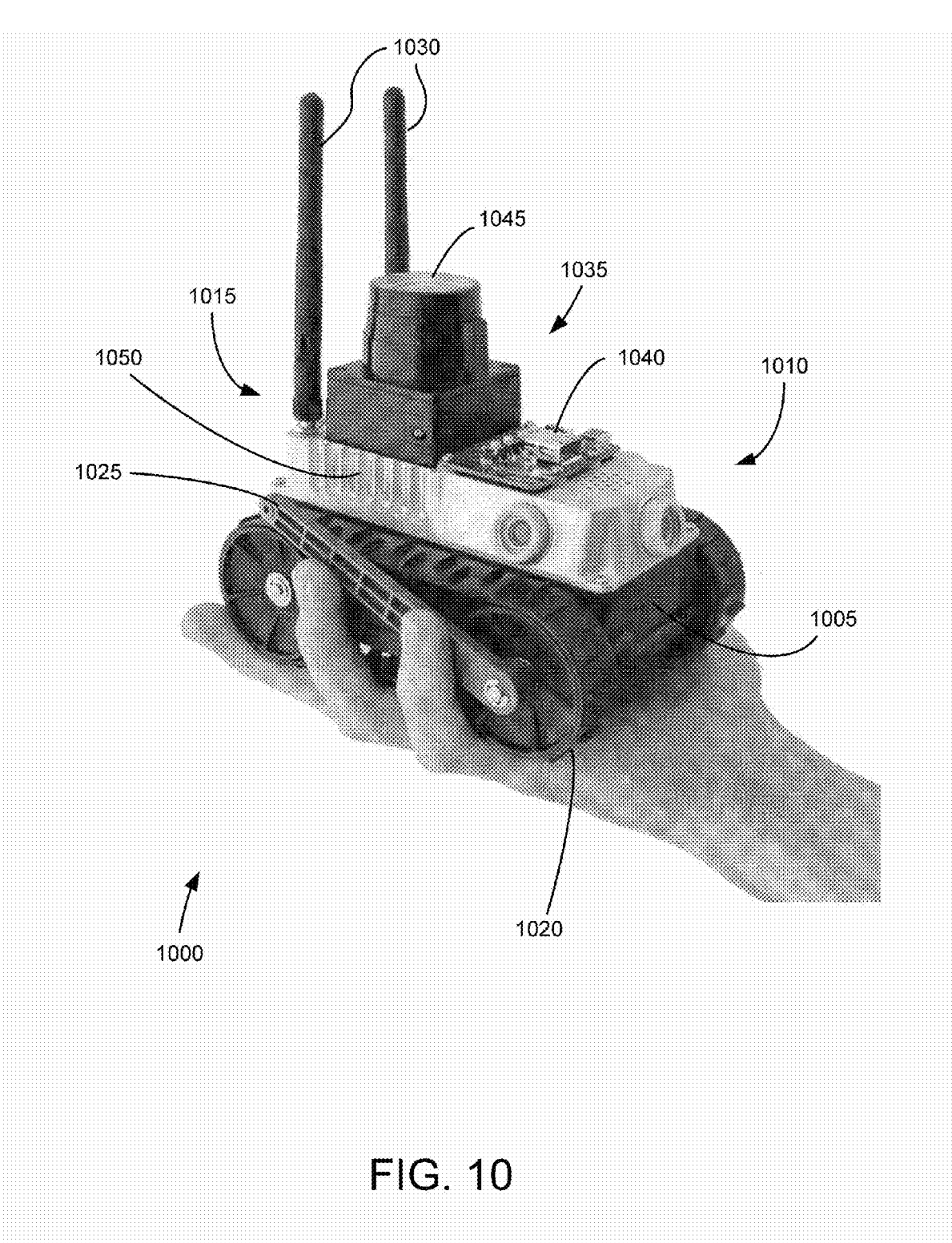
FIG. 10 is a front perspective view of an embodiment of a remote vehicle for facilitating research and development applications.

FIG. 10 is a front perspective view of a remote vehicle 1000 for facilitating research and development applications such as software development. Mobility and portability of hand-held sized remote vehicle is highly desirable to test numerous types of development packages in various environments and under various conditions. In certain embodiments of the present teachings, the remote vehicle weighs less than two pounds. In certain embodiments, the remote vehicle fits within a bounding volume approximately 7 inches long by 5 inches wide by 2 inches tall.

The remote vehicle 1000 comprises a chassis 1005 having a forward end 1010 having a first pair of wheels, a rearward end 1015 having a second pair of wheels, and driven support surfaces 1020 (e.g., cleated tracks). Each driven support surface 1020 is trained around one of the first pair of wheels at the front of the remote vehicle and one of the second pair of wheels at the rear of the vehicle, and is configured to propel the remote vehicle forward and rearward. The remote vehicle 1000 can also comprise at least one articulated arm 1025. In the illustrated embodiment, the articulated arm 1025 is coaxial with the pair of wheel located at the forward end 1010 of the remote vehicle. When the arm 1025 is coaxial with the pair of wheels of the forward end 1010, the arm can be driven to rotate about its axis in a first direction to raise the forward end 1010 and in a second direction opposite the first direction to raise the rearward end 1015. The articulated arm 1025 can be driven to rotate, for example, by a drive motor (not illustrated).

The remote vehicle 1000 may include a power source and a transceiver disposed within the chassis 1005. The power source, such as a battery, can provide power to drive the support surface 1020, to rotate the arm 1025, and to power the transceiver and other electrical components. The transceiver can be connected with one or more antennas 1030 which can be disposed on an outer surface of the chassis to send or receive signals (e.g., RF signals).

Figure 11:
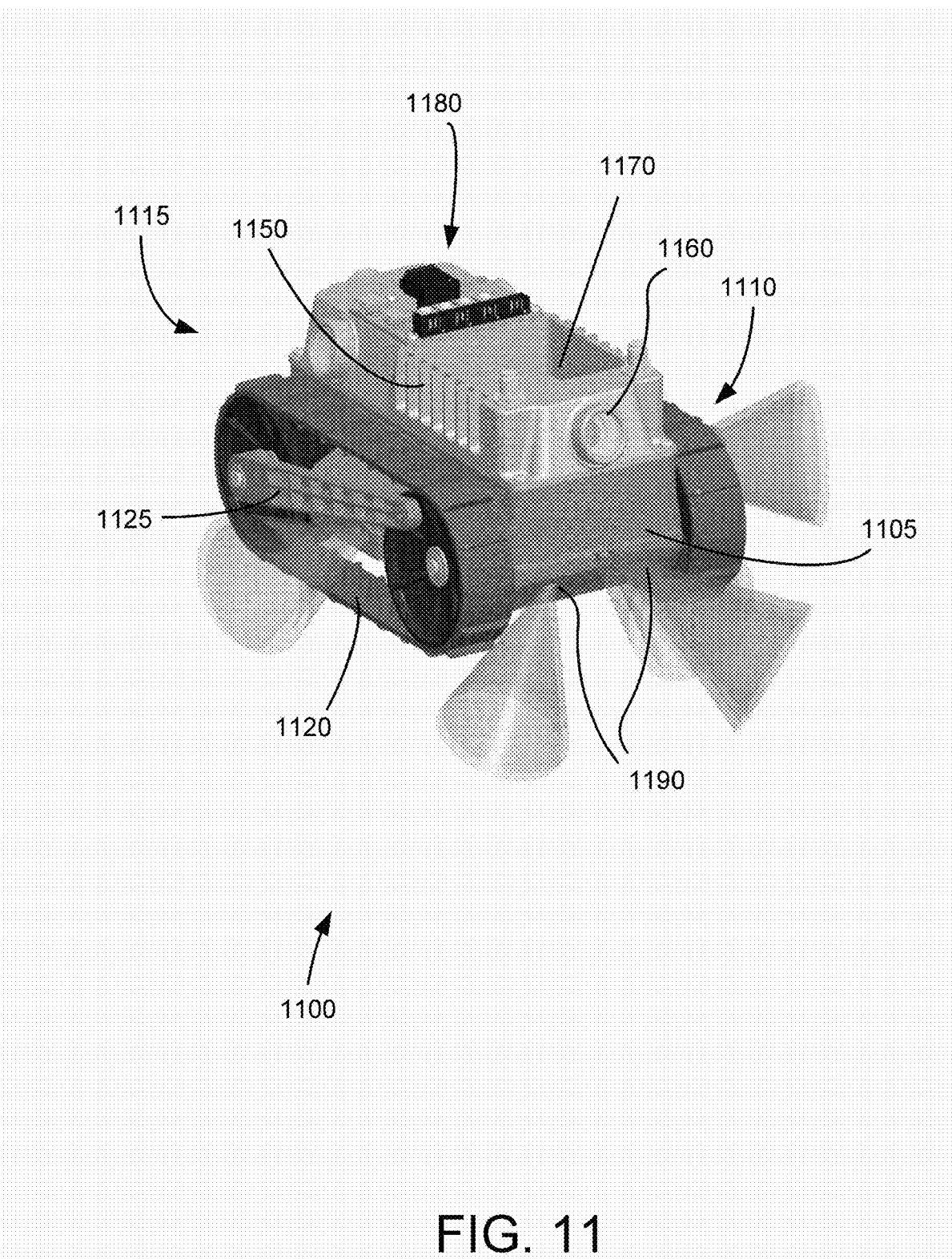
FIG. 11 is a rear perspective view of the remote vehicle embodiment of claim 10, without sensors attached so that the payload bays can be seen.

The remote vehicle 1000 comprises a research and development platform 1035 including at least one payload bay (see FIG. 11) and located on top of the remote vehicle chassis. The payload bay can be configured to support at least one sensor such as a laser scanner 1045 and a processor 1040. For example, the at least one sensor can include one or more of a wall sensor, cliff or obstacle sensor, a camera (for video or for still images, for example in any range of electromagnetic radiation including visible light and infrared), a microphone, a speaker, a vibration detector, a chemical sensor, an accelerometer, a gyroscope, or another type of sensor. Many of these sensor types can be provided as integral parts of the remote vehicle 100, such as the illustrated cameras 1160 (see FIG. 11) and cliff sensors 1190. The research and development platform can also include at least one power/data connection. A variety of suitable known power/data connectors are illustrated in FIG. 11 at 1180, and are located to be disposed between the processor 1045 and the interior of the chassis 1005. The power/data connectors 1180 are configured to provide a data connection and a power supply to processors (e.g., processor 1040) and sensors (e.g., laser scanner 1045) mounted on the research and development platform 1035. For example, the power/data connectors 1180 can be used to provide a power connection between a power supply disposed within the chassis 1005 and one or more processors and sensors mounted on the research and development platform 1035. The power/data connectors 1180 can also provide a connection between mounted sensors/processors and a transceiver disposed within the chassis 1005, through which the development package can send and receive data to, for example, an operator control unit for further processing and/ or to be used to control the remote vehicle.

A plurality of heat dissipating elements, for example fins 1050, is disposed on the research and development platform 1035. The heat dissipation elements are in contact with the payload bay 1170 (see FIG. 11) to dissipate heat from the illustrated laser scanner 1040 (or other sensor mounted in the payload bay) and from the processor 1045. In an exemplary embodiment of the present teachings, the research and development platform 1035 comprises aluminum and is therefore itself a heat dissipation element, and additionally includes heat dissipation fins 1050. The research and development platform 1035 need not comprise aluminum and can, alternatively, can comprise any suitably strong, heat-resistant, heat conducting material—provided that it efficiently draws heat away from any sensors and processors mounted on the research and development platform 1035.

The size and number of the fins 1050 can be designed to dissipate a predetermined amount of heat that the payload bay and other mounted elements would produce in either a worst-case or a typical scenario of employed sensors, and can also be determined by the available exposed surface area of the research and development platform 1035 and the material of the research and development platform 1035. The greater the surface area of the research and development platform 1035 and the greater the conductivity of the research and development platform 1035, the less fins are needed to assist in heat dissipation, because fins dissipate heat by increasing an amount of surface area to conduct heat away from its source. Heat dissipation is a greater concern in smaller classes of robots, for example the hand-held sized robot shown in FIG. 10. Such a small robot may not provide enough surface area for effective heat dissipation when sensors are installed in the payload bay, and therefore need additional heat dissipation capability that can be provided via a conductive material for the research and development platform, adding fins to the research and development platform, or both.

The embodiment illustrated in FIG. 10 includes two antennas mounted at a rear end of the remote vehicle, a laser scanner (e.g., a compact laser scanner such as a laser range finder by Hokoyo Automatic Co., LTD.) mounted in front of the two antennas. A main microprocessor on which the developing software can be run, for example a Texas Instruments™ OMAP processor. The battery can comprise, for example, a lithium ion battery.

FIG. 11 is a rear perspective view of the remote vehicle embodiment of claim 10, without sensors attached so that elements of the research and development platform can be seen. Camera 1160 are labeled in FIG. 11. In a preferred embodiment of the present teachings, four cameras are provided to allow adequate video coverage, for example on the front, rear, and sides of the robot. The payload bay can be seen at a rear of the research and development platform 1035. Fins can be provided on either side of the payload bay 1170, and the installed sensor may be a primary heat generator. Antenna mounts are provided to a rear of the payload bay 1170, and a variety of power/data connectors 1180 are provided in front of the payload bay 1170.

Some or all of the actions described herein can be performed under the control of a computer system executing computer-readable codes either in a computer-readable recording medium or in communication signals transmitted through a transmission medium. The computer-readable recording medium is any data storage device that can store data for a non-fleeting period of time such that the data can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transmission medium may include, for example, signals which modulate carrier waves transmitted through wired or wireless transmission paths.

The above description and associated figures illustrate the best mode of the present teachings. Other embodiments will be apparent to those skilled in the art from consideration of the specification and practice of the teachings disclosed herein, and it is intended that the specification and examples be considered as exemplary only, with a true scope and spirit of the present teachings being indicated by the following claims. Some aspects of the best mode may not fall within the scope of the present teachings as specified by the claims. Thus, those skilled in the art will appreciate variations from the best mode that fall within the scope of the teachings. Those skilled in the art will also appreciate that the features described below can be combined in various ways to form multiple variations of the present teachings. As a result, the present teachings are not limited to the specific examples described herein, but only by the claims and their equivalents.

What is claimed is:

1. A mobile robot system, comprising:
a first robotic vehicle comprising
a first end comprising a first pair of wheels, a second end comprising a second pair of wheels, and a first driven support surface surrounding the first and second pair of wheels to propel the first vehicle in the direction of the first and second ends of the first vehicle;
a second robotic vehicle comprising
a first end oriented toward the second end of the first vehicle and comprising a third pair of wheels, a second end oriented away from the first vehicle and comprising a fourth pair of wheels, and a second driven support surface surrounding the third and fourth pair of wheels to propel the second vehicle in the direction of the first and second ends of the second vehicle; and
a connecting member rotatably connected to the second end of the first vehicle to be coaxial with the second pair of wheels and rotatably connected to the first end of the second vehicle to be coaxial with the third pair of wheels, the connecting member being rotatable about the axis of the second pair of wheels by the first vehicle and rotatable about the axis of the third pair of wheels by the second vehicle such that the connecting member and each pair of wheels can rotate freely relative to each other.

2. The mobile robot system of claim 1, wherein the first and second driven support surfaces are configured to drive the first and second vehicles to raise the second end of the first vehicle and the first end of the second vehicle while the connecting member maintains a separation between the second end of the first vehicle and the first end of the second vehicle.

3. The mobile robot system of claim 1, wherein when the second end of the first vehicle and the first end of the second vehicle are raised, the first and second driven supports propel the robot system to rotate within a sweep volume defined by the first and second driven support surfaces.

4. A method for operating a mobile robot system to surmount an obstacle, the mobile robot system comprising a first vehicle having a first end comprising a first pair of wheels, a second end comprising a second pair of wheels, and a first driven support surface surrounding the first and second pairs of wheels, a second vehicle having a first end oriented toward the second end of the first vehicle and comprising a third pair of wheels, a second end oriented away from the first vehicle and comprising a fourth pair of wheels, and a second driven support surface surrounding the third and fourth pairs of wheels, and a connecting member rotatably connected to the first vehicle coaxial with the second pair of wheels and to the second vehicle coaxial with the third pair of wheels such that the connecting member and each pair of wheels can rotate freely relative to each other, the method comprising:
driving at least one of the first and second support surfaces to move the first vehicle and the second vehicle toward the obstacle until the first vehicle contacts the obstacle;
driving at least one of the first and second support surfaces to propel the first vehicle to ascend the obstacle;
rotating the connecting member in at least one of a first direction by the first vehicle and a second direction by the second vehicle while the first vehicle ascends the obstacle;
driving at least one of the first and second support surfaces and rotating the connecting member by at least one of the second vehicle in a third direction opposite to the second direction and by the first vehicle in a fourth direction opposite to the first direction while the first vehicle surmounts the obstacle to raise the first end of the second vehicle by the connecting member;
driving at least one of the first and second support surfaces when the first vehicle surmounts the obstacle until the connecting member contacts the obstacle at a point of contact;
driving the second support surface while maintaining the orientation of the connecting member relative to the first and second vehicles to rotate the connecting member about the point of contact until the second support surface contacts the obstacle;
rotating the connecting member by at least one of the first vehicle in the first direction and the second vehicle in the third direction until the first support surface engages the obstacle;
driving at least one of the first and second support surfaces and rotating the connecting member by the first vehicle in the first direction until the second vehicle begins to surmount the obstacle; and
driving at least one of the first and second support surfaces and rotating the connecting member by at least one of the first vehicle in a fourth direction opposite to the first direction and by the second vehicle in the second direction when the second vehicle surmounts the obstacle.

5. The method of claim 4, wherein driving at least one of the first and second support surfaces to move the first vehicle and the second vehicle toward the obstacle until first vehicle contacts obstacle comprises:
   rotating the connecting member by the first vehicle in the first direction to raise the first end of the first vehicle and driving at least one of the first and second support surfaces to move the first vehicle and the second vehicle toward the obstacle until first vehicle contacts obstacle.

6. The method of claim 4, wherein driving the second support surface while maintaining the orientation of the connecting member relative to the first and second vehicles to rotate the connecting member about the point of contact until second support surface contacts the obstacle comprises:
   driving the second support surface while maintaining the orientation of the connecting member relative to the first and second vehicles to rotate the connecting member about the point of contact until the first support surface disengages from the obstacle and the second support surface contacts the obstacle.

7. The method of claim 4, wherein rotating the connecting member by at least one of the first vehicle in the first direction and the second vehicle in the third direction until the first support surface engages the obstacle comprises:
   rotating the connecting member by at least one of the first vehicle in the first direction and the second vehicle in the third direction until the first support surface engages the obstacle and the second support surface disengages from the obstacle.

8. The method of claim 7, wherein driving at least one of the first and second support surfaces and rotating the connecting member by the first vehicle in the first direction until the second vehicle begins to surmount the obstacle comprises:
   driving at least one of the first and second support surfaces and rotating the connecting member by at least one of the first vehicle in the first direction and the second vehicle in the third direction until the second support surface engages the obstacle, and
   driving at least one of the first and second support surfaces until the second vehicle begins to surmount the obstacle.

* * * * *